(12) United States Patent
Nowselski

(10) Patent No.: US 8,895,826 B2
(45) Date of Patent: Nov. 25, 2014

(54) AUTOMATIC EMBOUCHURE

(71) Applicant: Chris Nowselski, Mount Vernon, NY (US)

(72) Inventor: Chris Nowselski, Mount Vernon, NY (US)

(*) Notice: Subject to any disclaimer, the term of this patent is extended or adjusted under 35 U.S.C. 154(b) by 0 days.

(21) Appl. No.: 13/686,406

(22) Filed: Nov. 27, 2012

(65) Prior Publication Data
US 2013/0160632 A1  Jun. 27, 2013

Related U.S. Application Data

(60) Provisional application No. 61/580,278, filed on Dec. 26, 2011.

(51) Int. Cl.
*G10D 7/02* (2006.01)
*G10D 9/02* (2006.01)
*G09B 15/00* (2006.01)

(52) U.S. Cl.
CPC .............. *G09B 15/00* (2013.01); *G10D 7/026* (2013.01); *G10D 9/02* (2013.01)
USPC ........................................................ 84/384

(58) Field of Classification Search
CPC .................................................. G10D 7/026
USPC ........................................................ 84/384
See application file for complete search history.

(56) References Cited

U.S. PATENT DOCUMENTS

| 801,086 | A | * | 10/1905 | Jenks ............................. 84/384 |
| 1,704,147 | A | * | 3/1929 | Paulson ....................... 84/383 R |
| 2,637,239 | A | * | 5/1953 | Swanson ......................... 84/384 |
| 3,062,084 | A | * | 11/1962 | Ogilvie ........................... 84/384 |
| 3,599,526 | A | * | 8/1971 | Sollecito et al. ............... 84/384 |
| 4,099,442 | A |   | 7/1978 | Amadio |
| 4,233,877 | A | * | 11/1980 | Okami ............................ 84/453 |
| 4,550,637 | A |   | 11/1985 | Drelinger |
| 4,672,878 | A |   | 6/1987 | Senior |
| 4,875,401 | A | * | 10/1989 | Culbreath ....................... 84/384 |
| 4,896,579 | A |   | 1/1990 | Goosman |
| 4,922,793 | A | * | 5/1990 | Culbreath ....................... 84/384 |
| 4,970,931 | A | * | 11/1990 | Culbreath ....................... 84/384 |
| 5,105,705 | A |   | 4/1992 | Drelinger |
| 5,261,308 | A |   | 11/1993 | Yamauchi |
| 5,435,221 | A | * | 7/1995 | Yamauchi ....................... 84/384 |
| 5,844,156 | A |   | 12/1998 | Nagahara |
| 6,034,312 | A |   | 3/2000 | Lubell |
| 6,399,867 | B1 |   | 6/2002 | Blocki |
| 6,570,077 | B1 |   | 5/2003 | Goss |
| 6,664,455 | B2 |   | 12/2003 | Aoki |
| 6,683,235 | B2 |   | 1/2004 | Aoki |
| 6,940,007 | B2 |   | 9/2005 | Schmidt |

(Continued)

FOREIGN PATENT DOCUMENTS

| EP | 1801779 | 6/2007 |
| EP | 2006834 | 12/2008 |

(Continued)

*Primary Examiner* — Robert W Horn
(74) *Attorney, Agent, or Firm* — Jacqueline Bardini

(57) ABSTRACT

The invention is an automatic embouchure comprising a device body, one or more latches, a primary connection means, one or more secondary connection means, an air flow modulator, a lip plate cover, a lip position panel, a left air channel guide rail and a right air channel guide rail, one or more latch canals, an air flow channel and, optionally a lower lip receptacle.

7 Claims, 20 Drawing Sheets

(56) References Cited

U.S. PATENT DOCUMENTS

| | | |
|---|---|---|
| 7,772,482 B2 | 8/2010 | Shibata |
| 7,781,667 B2 * | 8/2010 | Shibata ............... 84/723 |
| 2003/0070531 A1 | 4/2003 | Aoki |
| 2003/0070532 A1 | 4/2003 | Aoki |
| 2007/0044635 A1 | 3/2007 | Lee |
| 2007/0137468 A1 | 6/2007 | Shibata |
| 2010/0236382 A1 * | 9/2010 | Simbirdi ............... 84/477 R |
| 2013/0160632 A1 * | 6/2013 | Nowselski ............... 84/384 |
| 2014/0013925 A1 * | 1/2014 | Clissold ............... 84/384 |

FOREIGN PATENT DOCUMENTS

| | | |
|---|---|---|
| JP | 2008152217 A * | 7/2008 |
| JP | 2009271481 | 11/2009 |
| WO | 9016059 | 12/1990 |

* cited by examiner

Automatic Embouchure 100

Automatic Embouchure 100

Automatic Embouchure 100

Automatic Embouchure 100

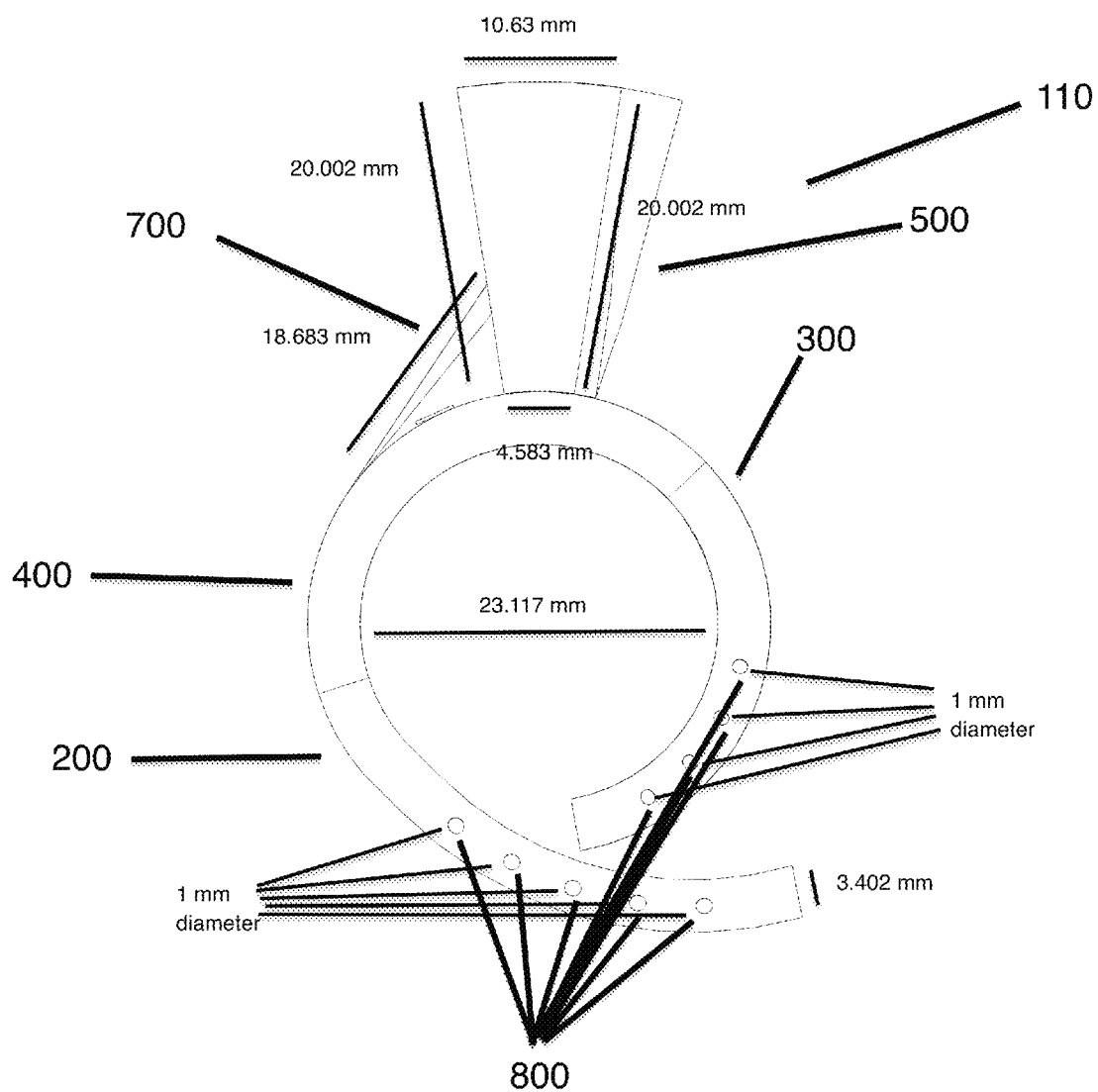

AUTOMATIC EMBOUCHURE

This application claims priority to U.S. Provisional Application Ser. No. 61/580,278 which is herein incorporated by reference in its entirety.

FIELD OF INVENTION

The present invention relates to devices for assisting individuals, subjects or players in playing or learning to play wind instruments such as a flute.

BACKGROUND OF THE INVENTION

About 54% of households in the United States have a member who plays an instrument. Not surprisingly, most individuals began their music study at a young age, with 64 percent beginning between the ages of 5 to 11, and 18 percent between the ages of 12 to 14.

Edge-blown aerophones is one of the categories of musical instruments found in the Hornbostel-Sachs system of musical instrument classification. In order to produce sound with these Aerophones the player makes a ribbon-shaped flow of air with his lips or his breath is directed through a duct against an edge. A flute produces sound when a stream of air directed across a hole in the instrument creates a vibration of air at the hole. The air stream across this hole creates a Bernoulli, or siphon. This excites the air contained in the usually cylindrical resonant cavity within the flute. The player changes the pitch of the sound produced by opening and closing holes in the body of the instrument, thus changing the effective length of the resonator and its corresponding resonant frequency. By varying the air pressure, a flute player can also change the pitch of a note by causing the air in the flute to resonate at a harmonic other than the fundamental frequency without opening or closing any holes.

The air stream must be directed at the correct angle and velocity, or else the air in the flute will not vibrate. In non-fipple flutes, the air stream is shaped and directed by the player's lips, called the embouchure. This allows the player a wide range of expression in pitch, volume, and timbre, especially in comparison to fipple/ducted flutes. However, it also makes an end blown flute or transverse flute considerably more difficult for a beginner to produce a full sound than a ducted flute, such as the recorder. Transverse and end-blown flutes also take more air to play, which requires deeper breathing and makes circular breathing a considerably trickier proposition.

The embouchure is the use of facial muscles and the shaping of the lips to the mouthpiece of woodwind instruments or the mouthpiece of the brass instruments. The word is of French origin and is related to the root bouche (fr.), 'mouth'. The proper embouchure allows the instrumentalist to play the instrument at its full range with a full, clear tone and without strain or damage to one's muscles, sometimes requiring many lessons before any sound can be produced.

U.S. Pat. No. 2,637,239 is directed to an embouchure open arch which fits just under the player's nose and prevents the flute from rolling and producing off-tone notes.

U.S. application Ser. No. 11/329,197 relates to a flute attachment with a thumb guard to prevent flute rotation during playing.

U.S. Pat. No. 3,599,526 is a U-shaped saddle-like device which can be permanently or detachably secured to any flute-like wind instrument having an open embouchure hole.

U.S. Pat. Nos. 3,970,932 and 4,922,793 disclose a mouthpiece plate for a flute-type wind instrument. One embodiment of the mouthpiece plate or a portion thereof is pivotable or movable to provide incremental adjustments of the movable portion. In an alternative embodiment, the mouthpiece plate is fixed but has a shape which provides stability for the instrument and aids in establishing optimum embouchure. In another alternative embodiment of the invention a mound-like projection element is integrally or releasably affixed to the mouthpiece plate to provide further support for the lower lip.

U.S. Pat. No. 4,875,401 is directed to a mouthpiece plate for a flute-type wind instrument. The mouthpiece plate or a portion thereof is pivotable or movable to provide for incremental adjustments of the movable portion to assist the flutist in establishing the optimum embouchure for his or her facial skeletal and muscular characteristics. In an alternative embodiment, the mouthpiece plate is fixed.

U.S. Pat. No. 4,896,579 is directed to a device with a lip plate with a front surface and which splits a stream of air over the top and below the lip plate.

U.S. Pat. No. 6,570,077 is a training device with a pressure sensor which assists in determining whether air support applied to a musical instrument is sufficient to produce an acceptable musical tone.

Taiwan Serial No. 094213789 (U.S. Pub. No. 20070044635) is directed to a flute attachment which includes a securing member attached to a lower flute surface for resting the thumb of a flute player. A tab end and the rear pad region define a thumb abutting area for application of forces to prevent undesirable rotation of the flute about the flute axis and to prevent undesirable downward displacement and deviation of the flute during playing.

Mastering the embouchure is often difficult and the individual is quickly dissuaded. There remains a need for devices which assist an individual in playing and/or learning to play a flute. Accordingly, the present invention solves these problems and encourages the individual to learn to play and/or perfect playing of a flute with ease and in a short period of time.

SUMMARY OF THE INVENTION

The preferred embodiment of the invention is an automatic embouchure 100 consisting of a body 110, one or more latches 120, a primary connection means 200, one or more secondary connection means 300, an air flow modulator 350, a lip plate cover 400, a lip position panel 500, a left air channel guide rail 600 and a right air channel guide rail 700, one or more latch canals 800, an air flow channel 900 and, optionally a lower lip receptacle 990.

In a preferred embodiment the air flow modulator 350 comprises a lip position panel 500, a left air channel guide rail 600 and a right air channel guide rail 700; a primary connection means 200 and an air flow channel 900 which lies between said left air channel guide rail 600 and said right air channel guide rail 700. Without being bound to any particular theory, the air flow modulator 350 allows the individual to more easily create the Bernoulli, or siphon, and allows the development of the embouchure by increasing the force of the air blown by the user.

One or more latch canals 800 are formed from the body 110, preferably on the primary connection means 200, and removeably attach to one or more latches 120. The intended position of the automatic embouchure 100 is wrapped around the flute head joint on top of the flute lip plate, for example, as in FIGS. 4, 27 and 28.

The object of the invention is to provide a device to assist an individual in learning to play the flute. Yet another object of the invention is to provide a device to assist an individual in playing the flute. Yet another object of the invention is a device for wrapping around the head joint of a flute to assist a player in playing or learning to play a flute. Still another objective of the present invention is to provide an air flow modulator which provides a superior embouchure and assists a new or experienced individual in playing the flute. Yet another object of the invention is to provide a device to increase the force of the air blown by the player of the wind instrument. Yet another object of the invention is to provide a device which creates an air seal around a wind instrument. Yet another object of the invention is to provide a device which is preferably flexible in nature.

BRIEF DESCRIPTION OF THE DRAWINGS

FIG. 20 is another embodiment of the invention.

DETAILED DESCRIPTION OF THE INVENTION

Definitions

Figure 1:
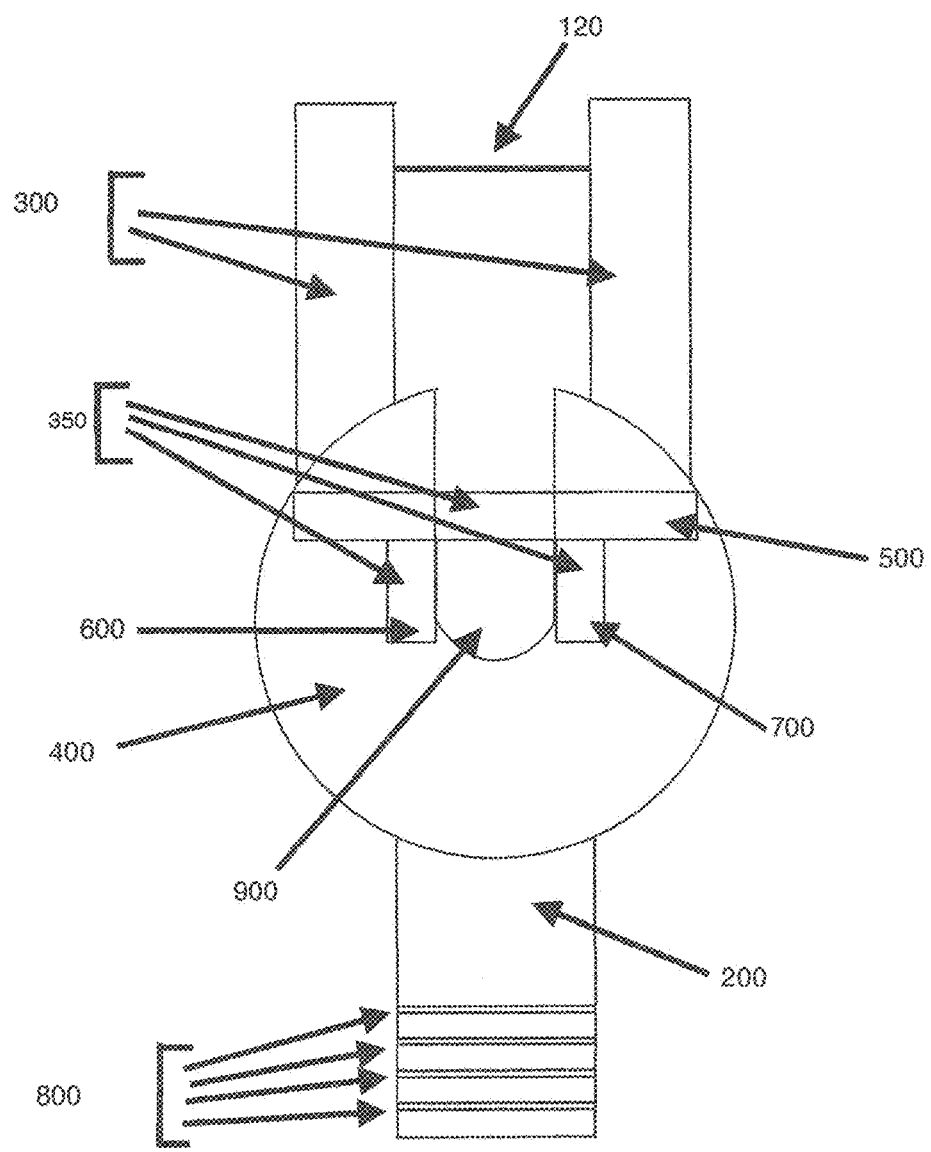
FIG. 1 is a top view of an embodiment of the present invention.

The term "about" or "approximately" means within an acceptable error range for the particular value as determined by one of ordinary skill in the art, which will depend in part on how the value is measured or determined, i.e. the limitations of the measurement system. For example, "about" can mean within one or more than one standard deviation, per practice in the art. Alternatively, "about" with respect to the measurements or formulations can mean a range up to 10%, preferably up to 5%.

The term "device" means the inventions described herein including the novel automatic embouchure.

The term "electronic" or "electronic format" means instructions included with one or more of the kits described herein which are produced in a computer format and must be placed into some electronic device to be deciphered and thereby observed by the user via audio, visual or both audio and visual means. Such devices include, but are not limited to, televisions, DVDs, blue ray DVDs, computers, laptop computers, desktop computer, electronic tablets, phones, IPods, MP3 players, printers or any electronic device now manufactured or that will be manufactured and which can decipher electronic instructions. The format of the electronic instructions may be without limitation, for example: pdf, jpeg, mp3, html, and the like. In other embodiments, the user may be directed to one or more web sites for instructions.

The term "embouchure" means the use of facial muscles and the shaping of the lips to the mouthpiece of woodwind instruments or the mouthpiece of the brass instruments. The word is of French origin and is related to the root bouche (fr.), 'mouth'. The proper embouchure allows the instrumentalist to play the instrument e.g., a flute, at its full range with a full, clear tone and without strain or damage to one's muscles.

The term "flexible" or "manufactured of flexible material" means malleable, stretchable or bendable or not rigid.

The term "flute" or "wind wood instrument" means an edge-blown aerophone which is one of the categories of musical instruments found in the Hornbostel-Sachs system of musical instrument classification particularly wind instruments including a flute, a fife or a piccolo.

The term "latch" may mean any shape material which is used to connect one end of the automatic embouchure to the other. In particular to connect the primary connection means to the secondary connection means. The term "connection pin" is meant to be used interchangeably with the term latch.

The term "marking instrument" means any instrument that can leave an imprint or mark including markers, pens, pencils, crayons, and the like.

The term "placement arrow" or "marker" refers to an area on the body of the automatic embouchure used to designate a position to which the user may rapidly and repeatedly attach the device at the same orientation as previously designated on the instrument which they are playing.

The term "print" or "print format" means information or instructions, such as those included with the one or more kits described herein, which are produced on paper or some other tangible material. Said print format may also include electronic data, similar to said printed format on which directions for use and specifications regarding the automatic embouchure may be contained.

The terms "rubber" means one or more nylon, plastics, resins, rubber, one or more natural or synthetic rubbers, or synthetic natural rubbers, thermoplastic elastomer, resins, plastomers, including, but not limited to one or more Santoprene, Santoprene 101-55, Santoprene 101-64, Santoprene 101-73, Santoprene 101-80, Santoprene 101-87, Santoprene 201-73, Santoprene 201-73-w175, Santoprene 201-64, Santoprene, 201-80, Santoprene 221-73, Santoprene 121-67, Santoprene 121-73, Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene Rubber, Ethylene Propylene Diene Monomer, Polyether Urethane, Perfluorocarbon Rubber, Fluoronated Hydrocarbon, Fluoro Silicone, Fluorocarbon Rubber, Fluoro Silicone, Fluorocarbon Rubber, Hydrogenated Nitrile Butadiene, Polyisoprene, Isobutylene Isoprene Butyl, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer and Styrene Butadiene Carboxy Block Copolymer; foam, silicone, ABS, Polycarbonate, Noryl, PVC, polystyrene, ABS/PVC, PVC/Acrlic, Polysulfone, Acrylic, Polyethylene, Kydes, PETC, fiberglass, borosilicate, quartz, wood, metals, including but not limited to nickel, iron, tin, aluminum, copper, rubber including but not limited to natural rubber, SBR, Isoprene rubber, Butadiene rubber, chloroprene rubber, Natural polyisopren, cis-1,4-polyisoprene natural rubber (NR) and trans-1,4-polyisoprene gutta-percha, Synthetic polyisoprene (IR for Isoprene Rubber), Polybutadiene (BR for Butadiene Rubber), Chloroprene rubber (CR), polychloroprene, Neoprene, Baypren, Butyl rubber (copolymer of isobutylene and isoprene, IIR), Halogenated butyl rubbers (chloro butyl rubber: CIIR; bromo butyl rubber: BIIR), Styrene-butadiene Rubber (copolymer of styrene and butadiene, SBR), Nitrile rubber (copolymer of butadiene and acrylonitrile, NBR), also called Buna N rubbers, Hydrogenated Nitrile Rubbers (HNBR) Therban and Zetpol (Unsaturated rubbers can also be cured by non-sulfur vulcanization if desired), EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA), natural or synthetic rubbers, or synthetic natural rubbers, thermoplastic elastomer, resins, or plastomers including, but not limited to Santoprene (of any formulation), Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene Rubber, Ethylene Propylene Diene Monomer, Polyether Urethane, Perfluorocarbon Rubber, Fluoronated Hydrocarbon, Fluoro Silicone, Fluorocarbon Rubber, Fluoro Silicone, Fluorocarbon Rubber, Hydrogenated Nitrile Butadiene, Polyisoprene, Isobutylene Isoprene Butyl, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer and Styrene Butadiene Carboxy Block Copolymer, or combinations thereof.

DESCRIPTION OF THE PREFERRED EMBODIMENTS

The preferred embodiments of the present invention will now be described with reference to the drawings. Identical elements in the various figures are identified with the same reference numerals. Reference will be made in detail to embodiments of the present invention. Such embodiments are provided by way of explanation of the present invention which is not intended to be limited thereto. In fact, those of ordinary skill in the art may appreciate upon reading the present specification and viewing the present drawings that various modifications and variations can be made there to.

FIG. 1 is a top view of an embodiment of the automatic embouchure 100 consisting of a body 110, one or more latches 120, a primary connection means 200, one or more secondary connection means 300, an air flow modulator 350, a lip plate cover 400, a lip position panel 500, a left air channel guide rail 600 and a right air channel guide rail 700, one or more latch canals 800, an air flow channel 900 and, optionally a lower lip receptacle 990.

In a preferred embodiment the air flow modulator 350 comprises a lip position panel 500 which lies in front of a left air channel guide rail 600 and a right air channel guide rail 700 and the air flow channel 900. In another embodiment the air flow modulator 350 comprises a lip position panel 500, a left air channel guide rail 600 and a right air channel guide rail 700, a primary connection means 200 and an air flow channel 900 which lies between said left air channel guide rail 600 and said right air channel guide rail 700. In other embodiments the air flow modulator 350 comprises a lip position panel 500 which lies in front of a left air channel guide rail 600 and a right air channel guide rail 700, the air flow channel 900 and a lip plate cover 400.

In another embodiment, one or more latch canals 800 are formed from the body 110, preferably on the primary connection means 200, said one or more latch canals 800 may removeably attach to one or more latches 120. In another embodiment there are two latch canals 800.

In one embodiment the body 110 is intimately connected to the primary connection means 200 and the one or more secondary connections means 300. In another embodiment, there may be one or more primary connection means 200. In still another embodiment here may be one or more secondary connection means 300. In another embodiment there are two primary connection means 200. In another embodiment there are three primary connection means 200. In another embodiment there are four primary connection means 200. In another embodiment there are two secondary connection means 300. In another embodiment there are three secondary connection means 300. In another embodiment there are four secondary connection means 300. In yet another embodiment, the body 110, primary connection means 200 and secondary connecting means 300 are fused as a single unit thereby eliminating the need for a connecting means, and the device is slipped onto the flute by the user. In yet another embodiment, the primary connection means 200 is intimately connected to the secondary connection means 300 via a rigid latch 120. In a preferred embodiment, one or more latches 120 are rigid pins which are intimately connected to the primary connection means 120 and the secondary connection means 300 by inserting said one or more rigid pins via one or more latch canals 800. The one or more rigid pins are made of material selected from stainless steel, plastic, and other materials disclosed herein. In the preferred embodiment, the latch canals 800 are rounded holes made to receive the latches 120, which are preferably rounded pins. In another embodiment the latch canals 800 are any shape selected from one or more semicircular, square, rectangular. In a preferred embodiment, the one or more latch canals 800 are rounded. Furthermore, the one or more latches 120 may be any corresponding shape made to connect with said one or more latches 120. In one embodiment said connection is a temporary, said one or more latches 120 being removable from said one or more latch canals 800. In another embodiment, the connection between the one or more latches 120 and the one or more latch canals 800 is permanent.

In a preferred embodiment, the body 110 consists essentially of the primary connection means 200 the secondary connection means 300 and the lip plate cover 400. In another embodiment, the body 110 is also intimately attached to the lip position panel 500 and to both, the left air channel guide rail 600 and a right air channel guide rail 700, to the latch 120 and to the latch canals 800. In another embodiment, the body 110 may be formed of one continuous piece. In another embodiment, the body 110 is constructed from one or more pieces. Said pieces may be connected in a manner known to one skilled in the art, said connections being formed by one or more methods, including but not limited to glue, heat, stitching, Velcro and the like. In yet another embodiment, the body 110 is manufactured as a single piece comprising the left air channel guide rail 600 and the right air channel guide rail 700.

The lip position panel 500 may be manufactured in any shape. In a preferred embodiment the lip position panel 500 is rectangular in shape. In another embodiment the lip position panel is semi-circular in shape. The lip position panel 500 may be any shape, preferably rectangular, but also may be one or more other shapes including but not limited to spherical, round, rectangular, square, triangular, semicircular and oblique and the like. In another embodiment, the left air channel guide rail 600 and a right air channel guide rail 700 are removeably attached to the lip position panel 500 and the lip plate cover 400. In a preferred embodiment, the lip position panel 500 is thicker near its distal portion from the body 110, and gradually becomes thinner and possesses a slightly downward slant as it approaches the body 110 and an arch in the lip position panel 500. Preferably, the lip position panel 500 is concave.

The left air channel guide rail 600 and the right air channel guide rail 700 are preferably right triangular in shape and intimately attach to the lip position panel 500. In the preferred embodiment, the left air channel guide rail 600 and the right air channel guide rail 700 are equidistant from one another. The left air channel guide rail 600 and a right air channel guide rail 700 may be one or more other shapes, including but not limited to spherical, round, rectangular, square, triangular, semicircular and oblique and the like.

In a preferred embodiment there is one latch 120 and one or more latch canals 800. In other embodiments there may be one or more latches 120. In another embodiment there may be two latches 120. In another embodiment there may be three latches 120. In another embodiment there may be four latches 120.

In a preferred embodiment the latch is made of a wire. In other embodiments, the one or more latches 120 may be made from one or more of any materials, including but not limited to stainless steel, nylon, plastics, resins, rubber, one or more natural or synthetic rubbers, or synthetic natural rubbers, thermoplastic elastomer, resins, plastomers, including, but not limited to one or more Santoprene, Santoprene 101-55, Santoprene 101-64, Santoprene 101-73, Santoprene 101-80, Santoprene 101-87, Santoprene 201-73, Santoprene 201-73-w175, Santoprene 201-64, Santoprene, 201-80, Santoprene 221-73, Santoprene 121-67, Santoprene 121-73, Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene Rubber, Ethylene Propylene Diene Monomer, Polyether Urethane, Perfluorocarbon Rubber, Fluoronated Hydrocarbon, Fluoro Silicone, Fluorocarbon Rubber, Fluoro Silicone, Fluorocarbon Rubber, Hydrogenated Nitrile Butadiene, Polyisoprene, Isobutylene Isoprene Butyl, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer and Styrene Butadiene Carboxy Block Copolymer; foam, silicone, ABS, Polycarbonate, Noryl, PVC, polystyrene, ABS/PVC, PVC/Acrlic, Polysulfone, Acrylic, Polyethylene, Kydes, PETC, fiberglass, borosilicate, quartz, wood, metals, including but not limited to nickel, iron, tin, aluminum, copper, rubber including but not limited to natural rubber, SBR, Isoprene rubber, Butadiene rubber, chloroprene rubber, Natural polyisopren, cis-1,4-polyisoprene natural rubber (NR) and trans-1,4-polyisoprene gutta-percha, Synthetic polyisoprene (IR for Isoprene Rubber), Polybutadiene (BR for Butadiene Rubber), Chloroprene rubber (CR), polychloroprene, Neoprene, Baypren, Butyl rubber (copolymer of isobutylene and isoprene, IIR), Halogenated butyl rubbers (chloro butyl rubber: CIIR; bromo butyl rubber: BIIR), Styrene-butadiene Rubber (copolymer of styrene and butadiene, SBR), Nitrile rubber (copolymer of butadiene and acrylonitrile, NBR), also called Buna N rubbers, Hydrogenated Nitrile Rubbers (HNBR) Therban and Zetpol (Unsaturated rubbers can also be cured by non-sulfur vulcanization if desired), EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA); or any combination or composites of these material or other materials and new materials that may be manufactured in the future. The one or more latches 120 may be manufactured using identical or different material. In another embodiment the latches 120 may also be manufactured using injection molding techniques known to those skilled in the art.

The one or more latches 120 may be intimately connected to the secondary connection means 300. The one or more latches may be removeably connected to the secondary connection means 300. The one or more latches 120 may located anywhere along the body 110, but are more preferably attached at some point along and in between more than one secondary connection means 300.

In one embodiment there may be one or more secondary connection means 300 intimately connected to the body 110 of the automatic embouchure 100. The secondary connection means 300 may be made as one or more pieces. The secondary connection means 300 may be a single piece with one or more locations for the attachment of the one or more latches 120. In the preferred embodiment, the body 110 is intimately connected to two arm-like projections on the latch 120 side, which are rectangular in shape and become said two secondary connection means 300. The secondary connection means 300 may be any shape, preferably rectangular, but also may be one or more other shapes including but not limited to square, triangular, semicircular, oblique, spherical and the like. The one or more secondary connection means 300 may be the same or they may be different in composite material, shape, length and width.

In one embodiment there may be one or more primary connection means 200 intimately connected to the body 110 of the automatic embouchure 100. The primary connection means 200 may be made as one or more pieces. The primary connection means 200 may be a single piece with one or more locations for the attachment of the one or more latch canals 800. In another embodiment, the primary connection means 200 is continuous with one or more latch canals 800. In the preferred embodiment, the body 110 is intimately connected to an arm-like projection on the latch canal 800 side. In this embodiment, this end of the body 110 becomes said primary connection means 200. The primary connection means 200 may be any shape, preferably rectangular, but also may be one or more other shapes including but not limited to square, triangular, semicircular, oblique, spherical and the like. The one or more primary connection means 200 may be the same or they may be different in composite material, shape, length and width.

The one or more secondary connection means 300 may be removeably connected anywhere along the body 110 of the automatic embouchure 100. In another embodiment, the one or more secondary connection means 300 may be intimately connected to the lip position panel 500. In yet another embodiment the one or more secondary connection means 300 may be removeably connected to the lip position panel 500.

In certain embodiments, there may be one or more latch canals 800 intimately connected to the primary connection means 200, and which removeably connect to one or more latches 120. In a preferred embodiment there are four latch canals 800. The latch canals 800 may be any size or shape to receive one or more latches 120. In a preferred embodiment, the latch canals 800 are recessed hook-shaped for receiving one or more latches 120. The latch 120 and the latch canals 800 are utilized to wrap the automatic embouchure 100 around the head joint of a flute. For example, a user may chose to removeably connect a latch 120 to any one of the latch canals 800 which will ensure a snug air seal around the flute head joint. Optionally, the use may choose to use a marking instrument to locate the exact point of attachment of the automatic embouchure 100 so that he/she may repeatedly attach the automatic embouchure at the same location to ensure repeated success in playing the flute.

The air flow channel 900 represents an opening in the air flow modulator 350. The air flow channel 900 is preferably a spherical opening which is continuous with the lip position channel 500 and the lip plate cover 400. In a preferred embodiment there is one air flow channel 900. In another embodiment, there may be one or more air flow channels 900.

The lip plate cover 400 is an extension of the primary connection means 200 part of the body 110. Without being bound to any particular theory, the lip position panel 500 along with the air flow modulator 350, including the left air channel guide rail 600, the right air channel guide rail 700 and the air flow channel 900 allow the player, with little effort, to produce an appropriate lip and muscle formation and an acceptable force of air through the air flow channel 900 to produce a tone. The player may begin playing the flute almost immediately and will be encouraged to continue playing thereby mastering his/her embouchure. Further, the flexible devices disclosed herein not only likely produce an increase in the force of the air blown into the flute by the player, but also produces and air seal, which further aids the player in quickly learning to play a flute.

The air flow channel 900 may be an opening of any size. The air flow channel may be any shape including but not limited to spherical, round, rectangular, square, triangular, semicircular, oblique and the like. In a preferred embodiment, the air flow channel 900 is a spherical opening which the player fits over the flute head joint on top of the lip plate. In one embodiment the air flow channel 900 opening measures about 0.3 cm in height and lies between the left air channel guide rail 600 and the right air channel guide rail 700. In another embodiment, the air flow channel 900 is present on both the lip plate cover 400 and the lip position panel 500. In still another embodiment, the air flow channel 900 is present on the lip plate cover 400.

Figure 2:
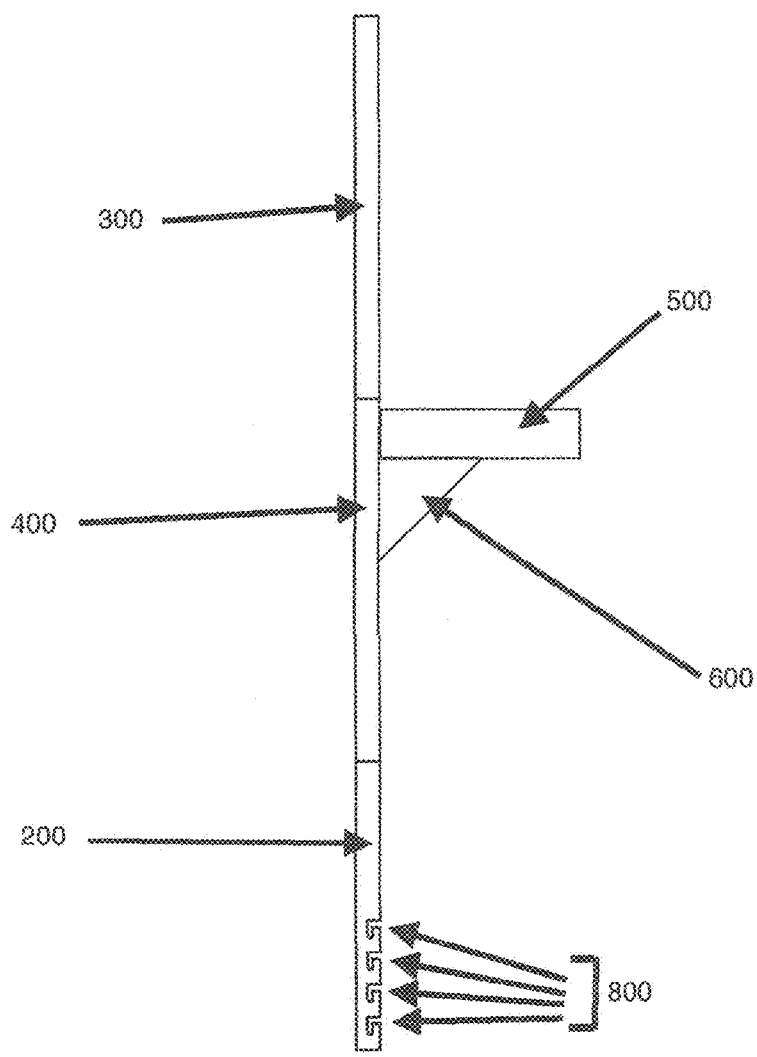
FIG. 2 is a side view of an embodiment of the present invention.

FIG. 2 is a side view of an embodiment of the present invention demonstrating the body 110, one or more latches 120, a primary connection means 200, a secondary connection means 300, an air flow modulator 350, a lip position panel 500, a left air channel guide rail 600 (and a right air channel guide rail 700 not in view in this side perspective), one or more latch canals 800, an air flow channel 900 and, optionally a lower lip receptacle 990.

In the preferred embodiment, the body 110 is continuous with the one or more latches 120, the primary connection means 200, the secondary connection means 300 and the air flow modulator 350.

There may be one or more latch canals 800 intimately connected to the primary connection means 200 and which removeably connect to one or more latches 120. In a preferred embodiment there are four latch canals 800. The one or more latch canals 800 are preferably carved into one or more primary connection means 200. The latch canals 800 may be any size or shape to receive one or more latches 120.

In a preferred embodiment, the latch canals 800 are recessed hook-shaped for receiving one or more latches 120. In an alternative embodiment, the latch canals 800 may be any of one or more shapes which effectively receive the latch 120 and hold the automatic embouchure 100 in place around the flute head. Such shapes for the latch canals 800 include, but are not limited to: hook-shape, U-shape, S-shape, Z-shape, C-shape or the like.

In an alternative embodiment, the latch canals 800 are protrusions which are located on top of the primary connection means 200. In an alternative embodiment, the latch canals 800 are protrusions which are located on top of the secondary connection means 300. In another embodiment, the protrusions which are the latch canals 800 are manufactured as part of the body 110 on the primary connecting means 200. The protrusions may also be any shape that may be able to receive a particular latch 120 and hold the automatic embouchure 100 in place around the flute head. Such shapes for the latch canals 800 include hook-shape, U-shape, S-shape, Z-shape, C-shape, square, circle, round, oblique, semi-circle, retectangular, triangular, spherical, eliptical or the like.

In other embodiments, the latch 120 and latch canals 800 are replaced by other closure mechanisms, or connecting means, known to one skilled in the art. For example, the closure mechanism, or connecting means (which replaces the latch 120 and latch canals 800), may be a zipper. In an alternative embodiment, the automatic embouchure 100 may wrap around the flute and be secured with a hook one end of the body 110 and an eye on the other end of the body, distal to the hook end. In other embodiments, there may be any type of latch or connection means known by one skilled in the art and which will effectively hold in place the automatic embouchure 100. In another embodiment the automatic embouchure 100 is held in place like a belt by utilizing one or more straight or curved hooks and one or more holes strategically placed on opposite sides of the body 110; in another embodiment the closure mechanism one or more holes or openings along one side of the body 110 (for example along the primary connection means 200 or the secondary connection means 300) and a protrusion or button-like device on the opposite side of the body 110 distal from the other side (for example along the secondary connection means 400 or the primary connection means 200). Accordingly, said protrusion or button-like device may removeably fit onto said holes, thereby securing the automatic embouchure 100 in place.

In other embodiments, Velcro may be utilized to connect the automatic embouchure to the flute. For instance, Velcro may be utilized throughout the body 110 permitting the user to adjust the automatic embouchure to the size of any flute. In alternate embodiments, Velcro may be sowed, glued, heat sealed, or attached by any method known to one skilled in the art, onto the body 110 during the manufacturing process of the automatic embouchure. In still other embodiments, clips may be utilized to connect the automatic embouchure 100 to the flute. Such clips include, but are not limited to D-clips and C-clips. Other securing means comprise snap-type releasable attaching means, buttons and button holes, hooks and eye-type releasable attaching means, and resilient hook and loop element-type releasable attaching means.

In another embodiment, the user may wrap the automatic embouchure around the flute and secure it with a wire twine of some sort. Said twine may be manufactured from hemp, silk, nylon, plastic and the like. In still another embodiment, the automatic embouchure 100 may be permanently glued or sowed into place over the flute head joint. In still another embodiment, the automatic embouchure 100 may be placed on the flute already possessed by the individual. In still another embodiment, the automatic embouchure 100 may be manufactured with the flute in the factory, and sold as a single unit.

Figure 3:
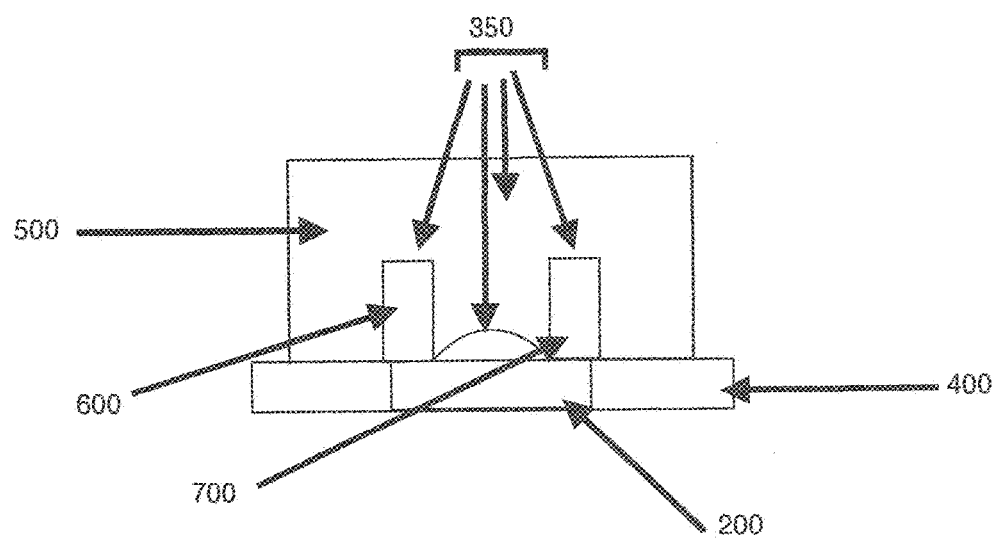
FIG. 3 is a front view of one embodiment of the present invention.

FIG. 3 is a front view of one embodiment of the present invention. The air flow channel 900 represents an opening in the air flow modulator 350. The opening is continuous with the lip position channel 500 and the lip plate cover 400. Said lip plate cover 400 is an extension of the primary connection means 200 part of the body 110.

Without being bound to any particular theory, when a player makes a ribbon-shaped flow of air with his lips or his breath, and said air is directed through a duct against an edge. A flute produces sound when a stream of air directed across a hole in the instrument creates a vibration of air at the hole. The air stream across this hole creates a Bernoulli, or siphon. In the present invention, the lip position panel 500 along with the air flow modulator 350, including the left air channel guide rail 600, the right air channel guide rail 700 and the air flow channel 900 allow the player, with little effort, to produce an appropriate lip and muscle formation and a force of air through the air flow channel 900. The player may begin playing the flute almost immediately and will be encouraged to continue playing thereby mastering their embouchure. The devices of the instant invention also assist the player because the flexible material utilized in the manufacture of the device produces an air seal around the wind instrument, thereby allowing the player to produce a greater force of air into the flute with minimal effort.

The air flow channel 900 may be an opening of any size. The air flow channel 900 may be any shape including but not limited to spherical, round, rectangular, square, triangular, semicircular and oblique and the like. In a preferred embodiment, the air flow channel 900 is a spherical opening which the player fits over the flute head joint on top of the lip plate of a flute. In one embodiment the opening is about 0.3 cm high on the arch of the lip position channel 500 and about 1.2 cm wide between the left air channel guide rail 600 and the right air channel guide rail 700. In another embodiment, the air flow channel 900 is continuous with the lip plate cover 400 and the lip position panel 500. In still another embodiment, the air flow channel 900 is present on the primary connection means 200.

Figure 4:
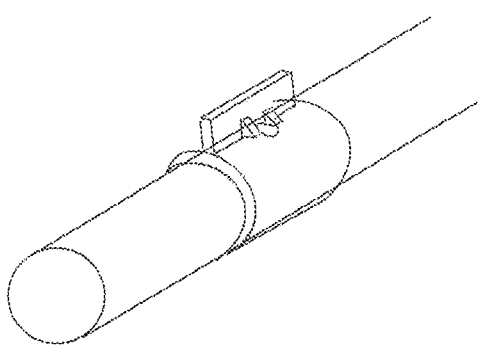
FIG. 4 demonstrates the intended position of an embodiment of the invention wrapped around a flute head joint.

FIG. 4 demonstrates the intended position of one embodiment of the invention, wherein the automatic embouchure 100 is wrapped around the flute head joint on top of the lip plate of a flute and also shows the optional lower lip receptacle 990.

Figure 5:
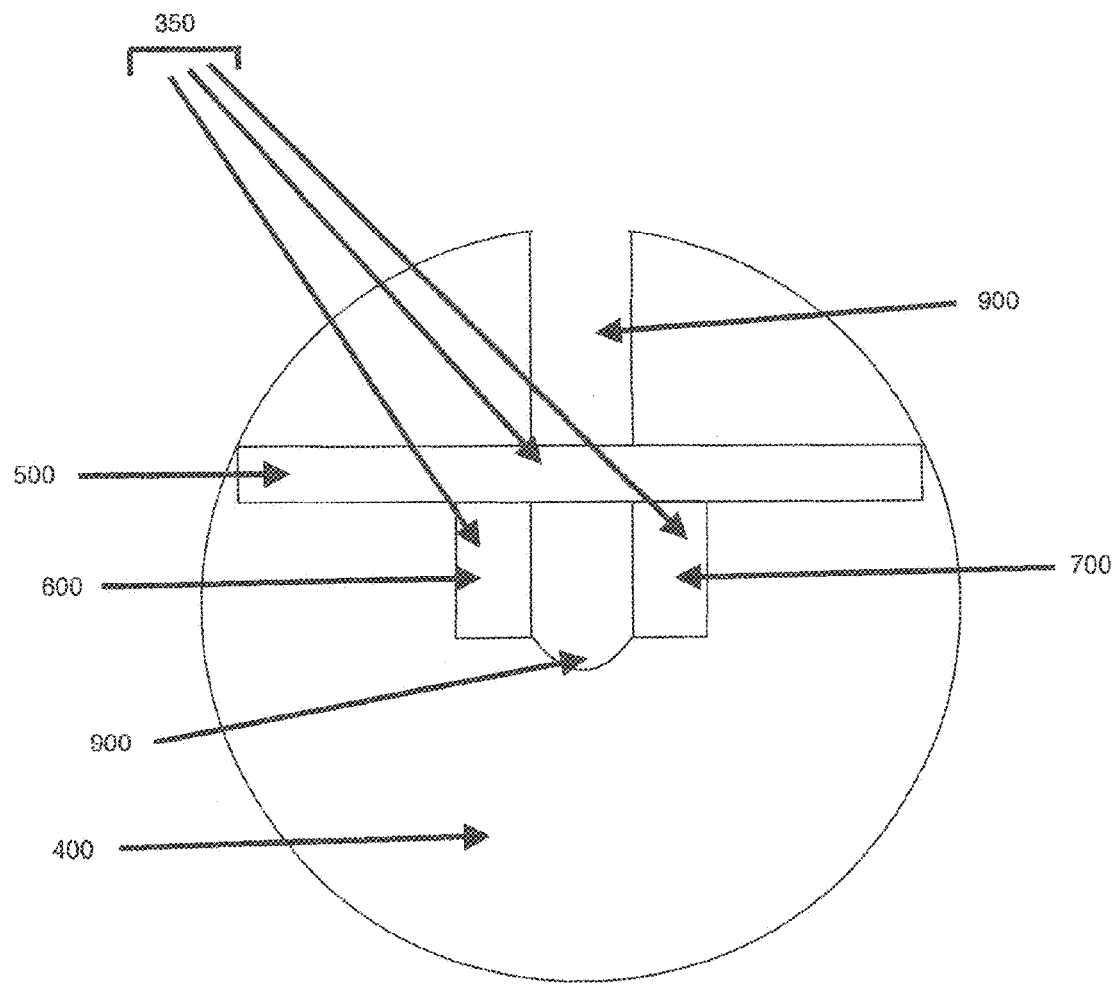
FIG. 5 is an exploded top view of the air flow modulator.

FIG. 5 is an exploded top view of the air flow modulator. The left air channel guide rail 600 and the right air channel guide rail 700 are spaced to guide the flow of air produced by a player blowing into the air flow channel 900 of the automatic embouchure 100. In the preferred embodiment, the left air channel guide rail 600 and the right air channel guide rail 700 are securely attached to the lip position panel 500 on one side, to the lip plate cover 400 on an adjacent side and open to the air on one or more of the other sides, depending on the shape. In still another embodiment, the lip plate cover 400 is continuous with the primary connection means 200.

In another embodiment, the left air channel guide rail 600 and the right air channel guide rail 700 are securely attached to the lip position panel 500 on one side, to the primary connection means 200 on an adjacent side and open to the air on still another side.

Figure 6:
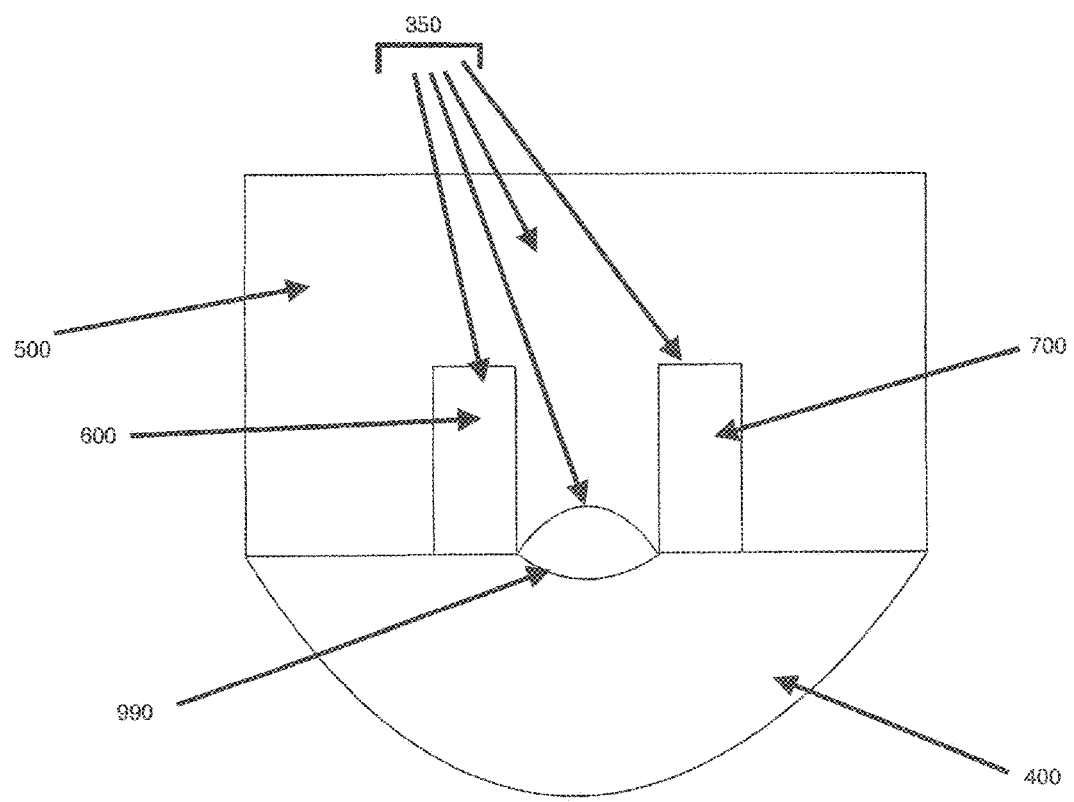
FIG. 6 is an exploded head on view of the air flow modulator.

FIG. 6 is an exploded head on view of the air flow modulator. In this embodiment the lip position panel 500 is rectangular in shape and is securely fastened to the body 110 of the automatic embouchure 100. In other embodiments, the left air channel guide rail 600 and the right air channel guide rail 700 are securely attached to the lip position panel 500, and on opposite sides of the air flow channel 900.

The left air channel guide rail 600 and the right air channel guide rail 700 may be one or more of any shape, including but not limited to square, circle, semi-circle, rectangular, triangular, spherical, elliptical or the like. In a preferred embodiment, the left air channel guide rail 600 and the right air channel guide rail 700 may be equally spaced apart. In another embodiment, the left air channel guide rail 600 and the right air channel guide rail 700 may be unequally spaced apart.

In one embodiment, left air channel guide rail 600 and the right air channel guide rail 700 are parallel to one another. In another embodiment the left air channel guide rail 600 and the right air channel guide rail 700 forms a 90 degree angle with the air flow channel 900 opening. In another embodiment the left air channel guide rail 600 and the right air channel guide rail 700 form a 180 degree angle with the air flow channel 900 opening. In still another embodiment the left air channel guide rail 600 and the right air channel guide rail 700 forms a 45 degree angle with the air flow channel 900 opening. In an alternate embodiment the left air channel guide rail 600 and the right air channel guide rail 700 forms an angle from about 30 degrees to about 180 degrees with the air flow channel 900 opening. In an alternate embodiment the left air channel guide rail 600 and the right air channel guide rail 700 form an angle from about 45 degrees to about 90 degrees with the air flow channel 900 opening.

Figure 7:
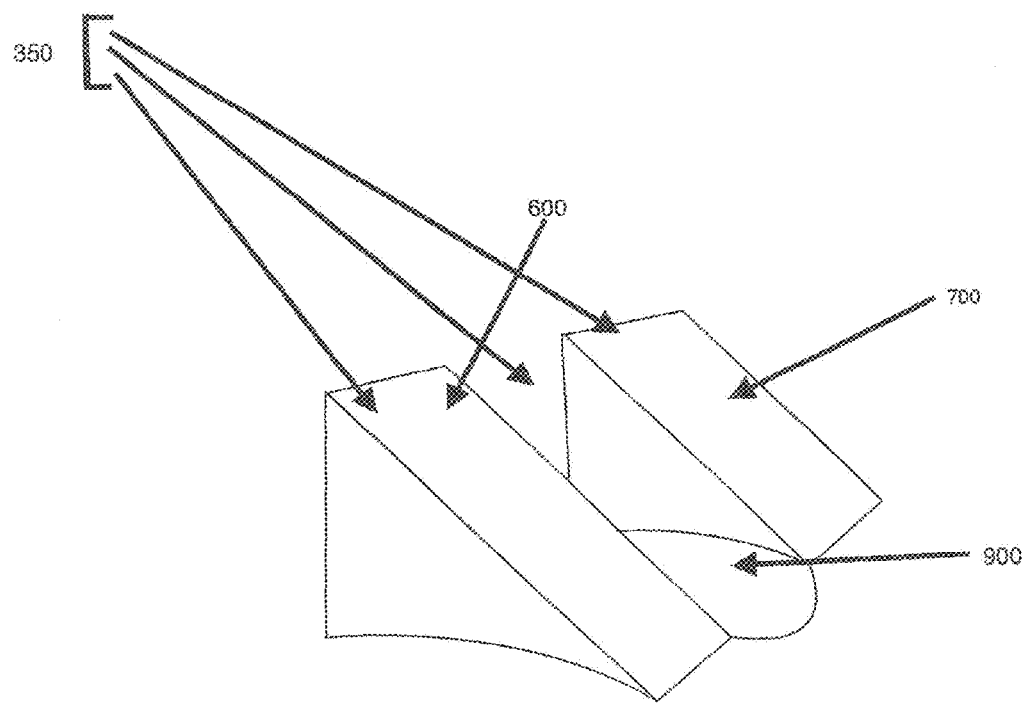
FIG. 7 is an exploded angled view of the air flow modulator.

FIG. 7 is an exploded angled view of the air flow modulator. In this embodiment, a triangular-shaped left air channel guide rail 600 and right air channel guide rail 700 permit air to flow into the air flow channel 900 with particular force sufficient to permit a novice to quickly master his/her embouchure.

Figure 8:
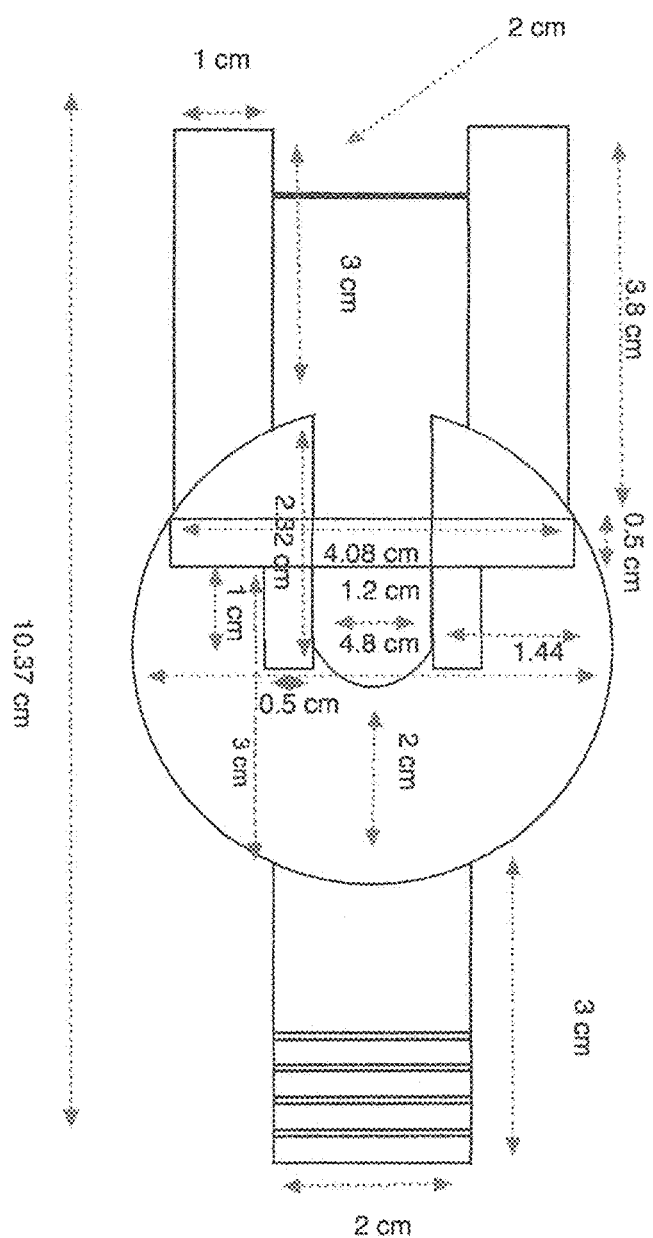
FIG. 8 is a top view of an embodiment of the present invention.
Figure 9:
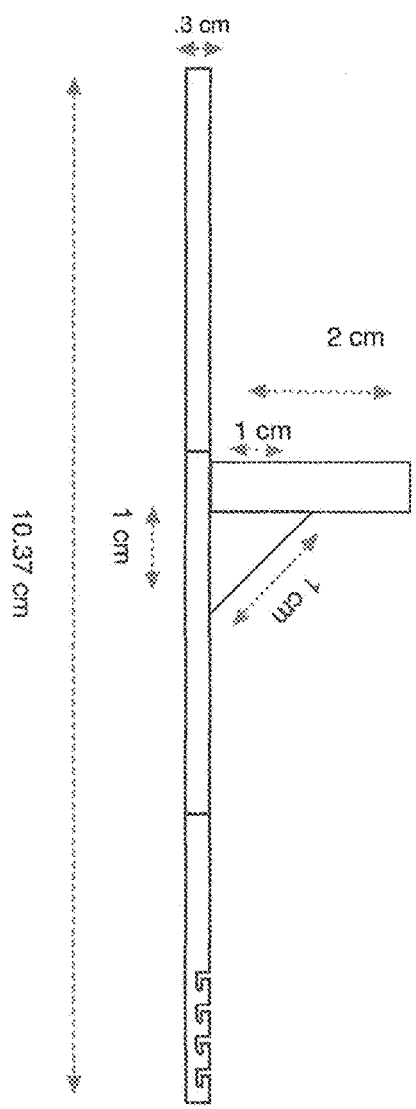
FIG. 9 is a side view of an embodiment of the present invention.
Figure 10:
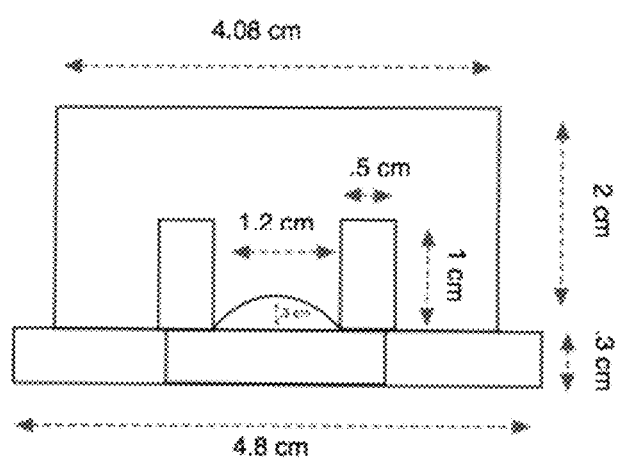
FIG. 10 is a front view of one embodiment of the present invention.

FIGS. 8-10 are particular embodiments demonstrating one preference for dimensions of the various parts of the automatic embouchure 100; however, dimensions are for demonstrative purposes only, and each measurement may vary by about +/−10% of the stated measurement. In another embodiment, each measurement may vary by about +/−5% of the stated measurement. In another embodiment each measurement may vary by about from 1% to about +/−20% of the stated measurement.

FIG. 8 is a top view of one embodiment of the present invention showing the dimensions of the major parts of the automatic embouchure 100 in relation to one another. In this particular embodiment, the body 110 is about 10.37 cm long; the latch 120 is about 2 cm in length. In a preferred embodiment, the device is approximately 4.8 cm in total width and about 10.37 cm in length. The primary connection means 200 is 3 cm in length and contains 4 width-wise slits for the latch to fit and to secure the automatic embouchure 100 around a flute head joint; the secondary connection means 300 are about 3.8 cm in length on their outer most aspects and about 3 cm in length on their inner aspects; the widths of the secondary connection means 300 are about 1 cm each; the lip plate cover 400 is circular with a diameter of about 4.8 cm and a cut out to form part of the air flow channel 900 which is about 0.3 cm across. The lip position panel 500 is rectangular and approximately 4.08 cm in length; the left air channel guide 600 and the right air channel guide 700 are each about 1 cm long and about 0.5 cm in width, and measure about 1.44 cm from the inner aspect of each air channel guide to the outer aspect of the lip position panel 500. In another embodiment, the body 110 is from about 9.85 cm to about 10.89 cm long. In another embodiment, the body 110 is from about 9.0 cm to about 11.74 cm long.

In another embodiment, the latch is about 3.8 cm to about 4.2 cm in length. In another embodiment, the latch is about 3.6 cm to about 4.4 cm in length. In a preferred embodiment, the latch is about 1.9 cm to about 2.1 cm in length. In another preferred embodiment, the latch is about 1.8 cm to about 2.2 cm in length.

In another embodiment, the primary connection means 200 is from about 2.85 cm in length to about 3.15 cm in length. In another embodiment, the primary connection means 200 is from about 2.7 cm in length to about 3.3 cm in length.

In another embodiment, the secondary connection means 300 are from about 1.9 cm in length to about 5.7 cm in length on their outer most aspects and from about 2.85 cm in length to about 3.25 cm in length on their inner aspects. In another embodiment, the secondary connection means 300 are from about 3.42 cm in length to about 4.18 cm in length on their outer most aspects and from about 2.7 cm in length to about 3.3 cm in length on their inner aspects.

In another embodiment, the widths of the secondary connection means 300 are from about 0.95 cm to about 1.05 cm each. In another embodiment, the widths of the secondary connection means 300 are from about 0.9 cm to about 1.1 cm each.

In another embodiment, the lip plate cover 400 about 4.56 cm across to about 5.04 cm across and contains a cut out to form part of the air flow channel 900 which is from about 0.29 cm across to about 0.32 cm across. In another embodiment, the lip plate cover 400 about 4.32 cm across to about 5.28 cm across and contains a cut out to form part of the air flow channel 900 which is from about 0.6 cm across to about 0.33 cm across.

In another embodiment, the lip position panel 500 is rectangular, but can be any shape, and is from about 3.88 cm in length to about 4.28 cm in length. In another embodiment, the lip position panel 500 is from about 3.67 cm in length to about 4.49 cm in length.

In still another embodiment, the left air channel guide 600 and the right air channel guide 700 are each from about 0.95 cm long to about 1.05 cm long and from about 0.48 cm in width 0.53 cm in width, and measure from about 1.37 cm to about 1.51 cm from the inner aspect of each air channel guide to the outer aspect of the lip position panel 500. In one embodiment, the left air channel guide 600 and the right air channel guide 700 may be spaced about 1.2 cm apart. In another embodiment the left air channel guide 600 and the right air channel guide 700 may be spaced from about 1.14 cm to about 1.26 cm apart.

In still another embodiment, the left air channel guide 600 and the right air channel guide 700 are each from about 0.9 cm long to about 1.1 cm long and from about 0.45 cm in width 0.55 cm in width, and measure from about 1.3 cm to about 1.58 cm from the inner aspect of each air channel guide to the outer aspect of the lip position panel 500. In one embodiment, the left air channel guide 600 and the right air channel guide 700 may be spaced about 1.2 cm apart. In another embodiment the left air channel guide 600 and the right air channel guide 700 may be spaced from about 1.08 cm to about 1.32 cm apart.

FIG. 9 is a side view of an embodiment of the present invention showing the dimensions of the body 110, the lip position panel 500 and the left air channel guide rail 600. The body 110 is about 10.37 cm long and about 0.3 cm in high; the left air channel guide rail 600 is a right triangle, although it may be any shape, with each side measuring about 1 cm. The lip position plate 500 measures about 2 cm from the side of the body 110 to which it is attached. In another embodiment the body 110 is from about 9.85 cm to about 10.89 cm long and from about 0.29 cm to about 0.32 cm in width; the left air channel guide rail 600 is a right triangle, although it can be any shape, with each side measuring from about 0.95 cm to about 1.05 cm. In still another embodiment, the lip position plate 500 measures from about 1.9 cm to about 2.1 cm from the side of the body 110 to which it is attached. In yet another embodiment the body 110 is from about 9.33 cm to about 11.41 cm long and from about 0.27 cm to about 0.33 cm in width; the left air channel guide rail 600 is a right triangle, although it may be any shape, with each side measuring from about 0.9 cm to about 1.1 cm. In another embodiment, the lip position plate 500 measures from about 1.8 cm to about 2.2 cm from the side of the body 110 to which it is attached. FIG. 10 is a front view of one embodiment of the present invention, showing the air flow module 350. The left air channel guide rail 600 and right air channel guide rail 700 are each about 1 cm high and about 0.5 cm wide, and measure approximately 1.2 cm apart; the air flow channel 900 measures about 0.3 cm across. The lip position panel 500 is about 4.08 cm in length and about 2 cm in height; the primary connection means 200 of the body 110 of the automatic embouchure 100 is about 4.8 cm in width and about 10.37 cm in length.

In another embodiment, he left air channel guide rail 600 and right air channel guide rail 700 are each from about 0.95 cm to about 1.05 cm high and from about 0.48 cm to about 0.53 cm wide, and measure from about 1.14 cm to about 1.26 cm apart; the air flow channel 900 measures from about 0.29 cm to about 0.32 cm across. In another embodiment, the lip position panel 500 is from about 3.89 cm to about 4.28 cm in length and from about 1.9 cm to about 2.1 cm in height. In another embodiment, the primary connection means 200 of the body 110 of the automatic embouchure 100 is from about 4.56 cm to about 5.04 cm in length and from about 0.29 cm to about 0.32 cm in width at its cross section. In another embodiment, there is an arch in the lip position panel 500 which is about 0.3 cm at its highest point.

In still another embodiment, the left air channel guide rail 600 and right air channel guide rail 700 are each from about 0.9 cm to about 1.1 cm high and from about 0.45 cm to about 0.55 cm wide, and measure from about 1.08 cm to about 1.32 cm apart. The air flow channel 900 measures from about 0.27 cm to about 0.33 cm. In another embodiment, the lip position panel 500 is from about 3.67 cm to about 4.49 cm in length and from about 1.8 cm to about 2.2 cm in height. In another embodiment, the primary connection means 200 of the body 110 of the automatic embouchure 100 is from about 4.32 cm to about 5.28 cm in length and from about 0.27 cm to about 0.33 cm in width at its cross section.

FIG. 10 demonstrates additional optional dimensions of one embodiment of the instant invention.

Figure 11:
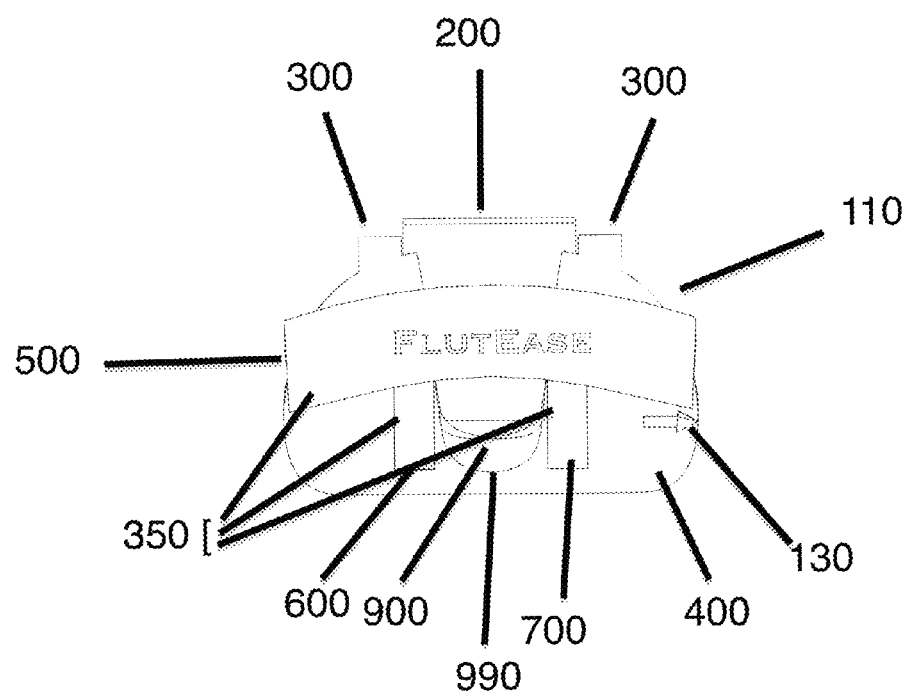
FIG. 11 is a top view of one embodiment of the invention.

FIG. 11 is a top view of one embodiment of the invention. The marker 130 is apparent on the body 110, or on the lip plate cover 400, and is utilized by the individual as an aid in placing the automatic embouchure in the same orientation as when previously utilized, thereby permitting consistency in performance from one time to another. In one embodiment the marker is a placement arrow, but it can mean any mark, color or raised surface to aid as a marker for the user. In this particular embodiment, the primary connection means 200 and two secondary connection means 300, are both noted in their positions when they are in place wherein they encircle the instrument to be played by the individual, and meeting up as they emerge from opposite directions (not shown). The lip position panel 500 is concave and is perpendicular to the left air channel guide rail 600, the right air channel guide rail 700 and the air flow channel 900, these members thereby also comprising the air flow modulator 350. The optional lower lip receptacle 990 is adjacent to the air flow channel 900, the air flow channel 900 being cut out of the lip plate cover 400.

Figure 12:
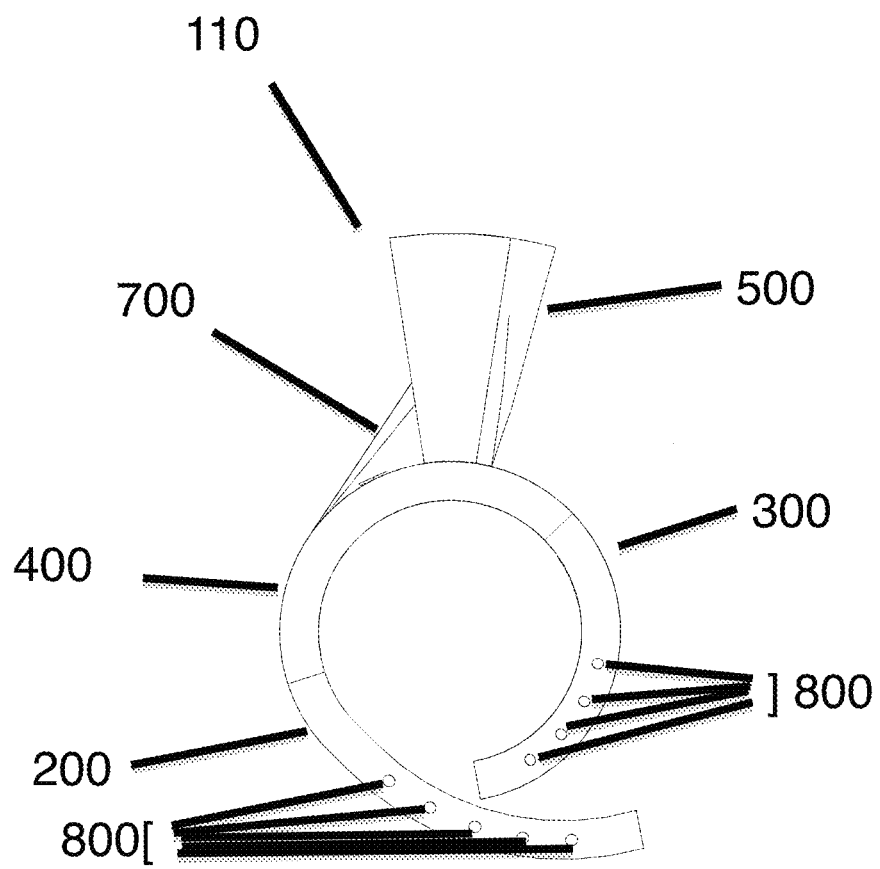
FIG. 12 is a side view of one embodiment of the invention.

FIG. 12 is a side view of one preferred embodiment of the invention. The lip position panel 500 is wider near to the portion distal to the body 110. The body 110 is comprised of the lip plate cover 400, one or more primary connection means 200, one or more secondary connection means 300, along with their connecting members. Furthermore, the lip position panel 500 is perpendicular to the lip plate cover 400 one or more primary connection means 200, one or more secondary connection means 300, along with their connecting members. The right air channel guide 700 angularly extends from its origin above the lip plate cover 400, and angularly extending into the lip position panel 500. One or more latch canals 800 permeate perpendicularly through the one or more primary connection means 200 and the one or more secondary connection means 300. In a preferred embodiment, the latch canals 800 are circular and made to securely receive the one or more connection pins 120, which secure the primary connection means 200 and the secondary connection means 300 to one another and securely fastens the device to the instrument.

Figure 13:
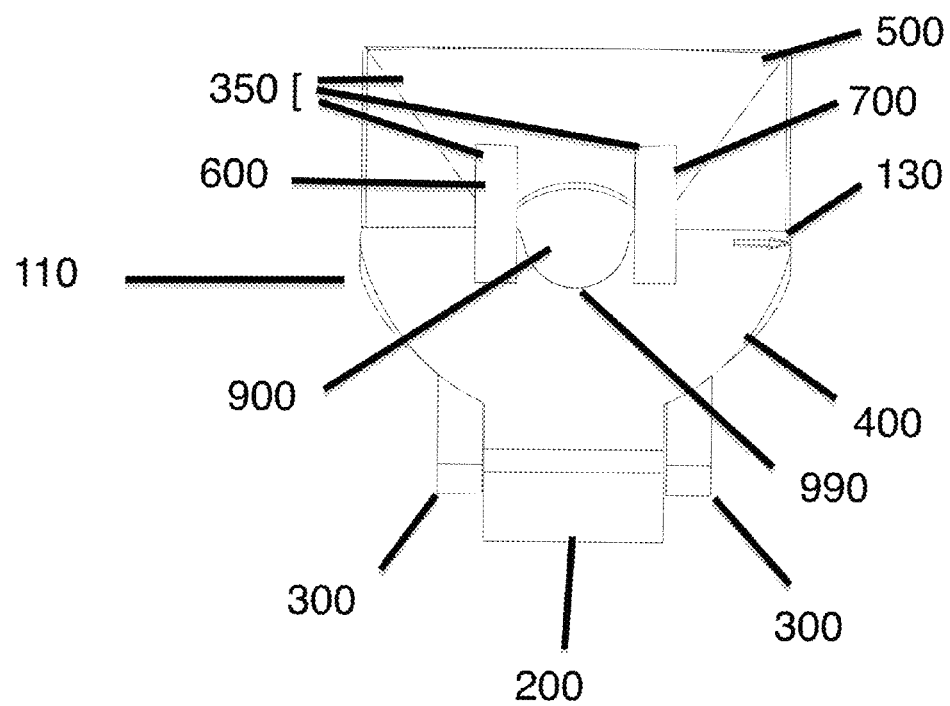
FIG. 13 is a front view of one embodiment of the invention.

FIG. 13 is a front view of one embodiment of the invention as seen from the perspective of the user when wrapped around an instrument. The lip position panel 500 is intimately connected to the left air channel guide rail 600 and the right air channel guide rail 700, and the air flow channel 900 is cut into the lip plate cover 400, thereby comprising the air flow modulator 350. The lip plate cover 400 is intimately connected to the lip position panel 500, except for an opening formed by an arch in the lip position panel 500 and the lip plate cover 400, said opening comprising the air flow channel 900. The left air channel guide 600 lies adjacent to the right air channel guide 700, both angularly extending from their origins above the lip plate cover 400, extending into intimate contact with the lip position panel 500. The one or more primary connection means 200 wraps around the instrument towards the one or more secondary connection means 300.

Figure 14:
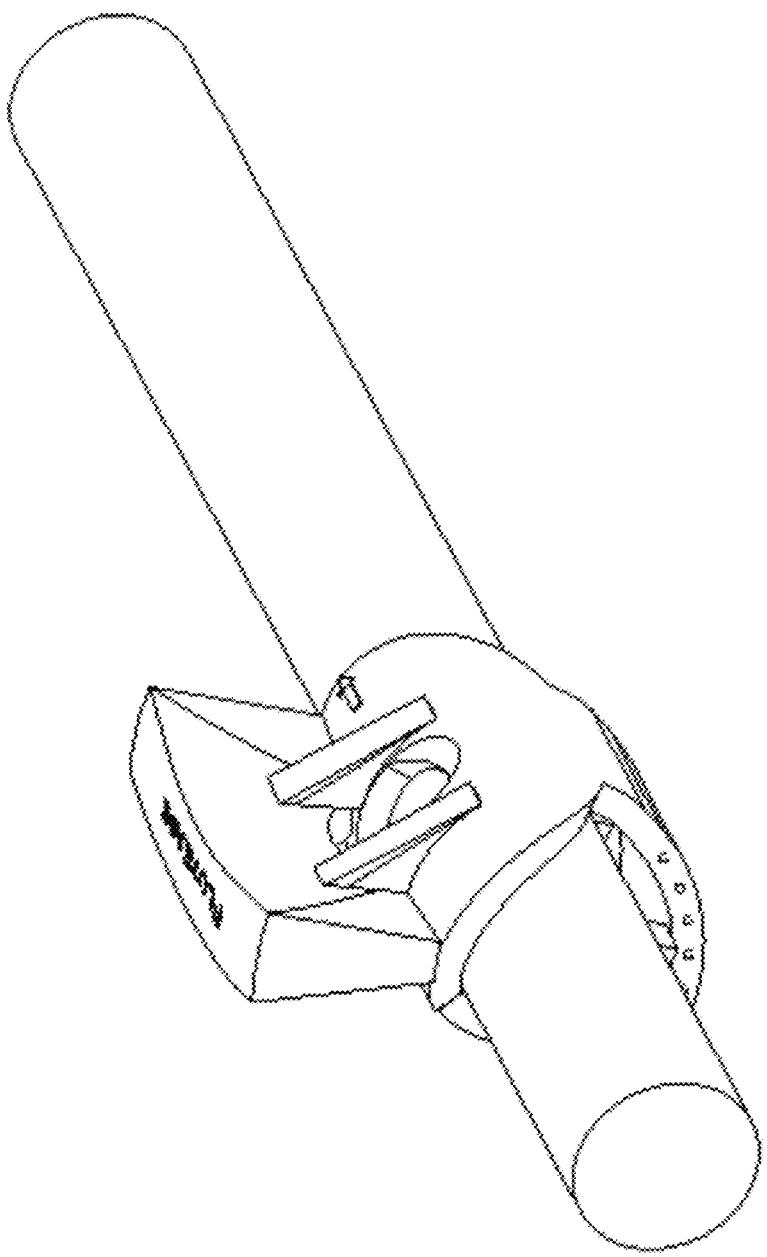
FIG. 14 is a left/frontal view of the invention wrapped around an instrument.

FIG. 14 is a left/frontal view of the invention wrapped around an instrument.

Figure 15:
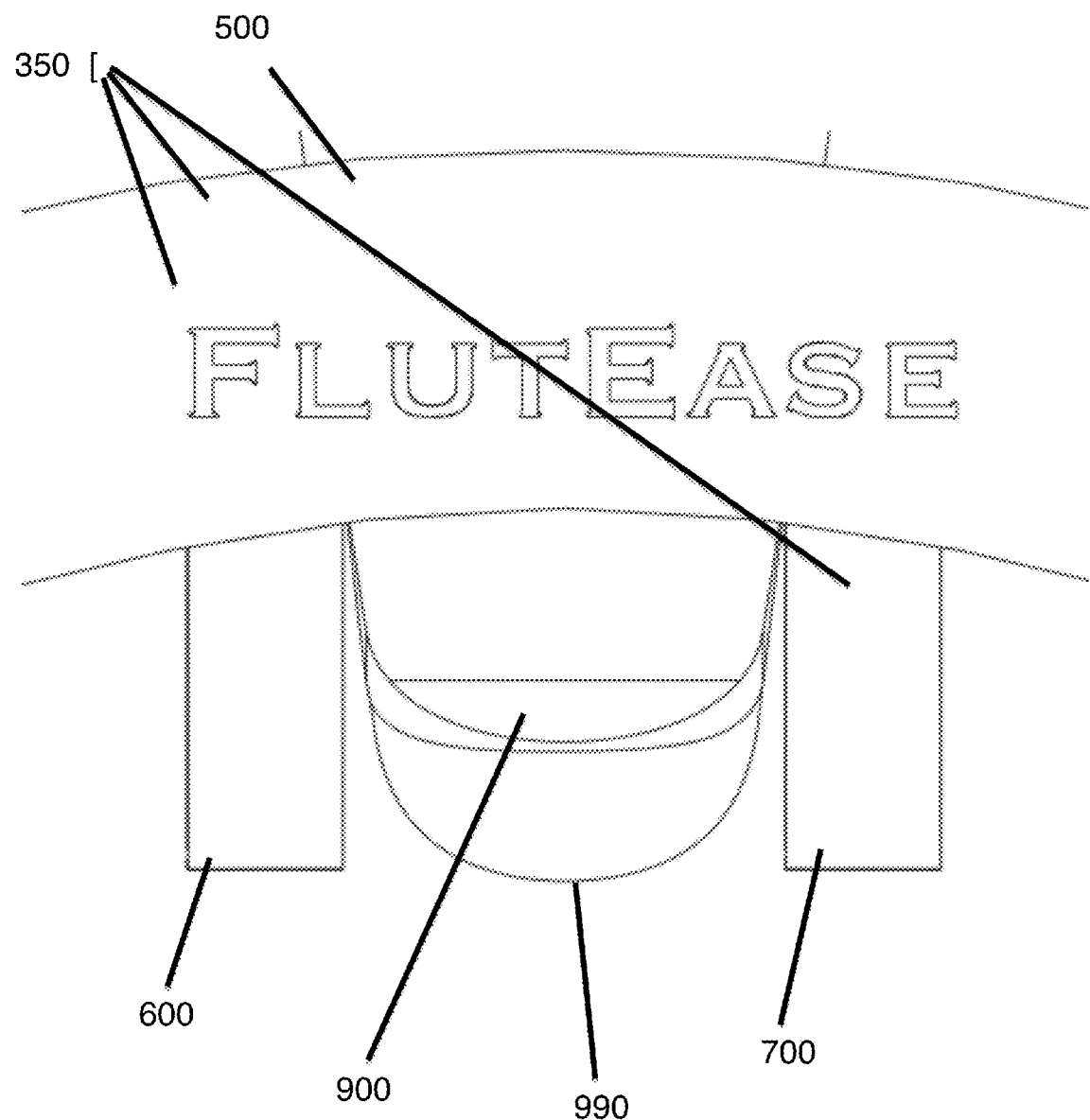
FIG. 15 is a top side exploded view of the air flow modulator.

FIG. 15 is a top side exploded view of the air flow modulator 350, showing the concave lip position panel 500, intimately connected with the left air channel guide 600 which lies adjacent to the right air channel guide 700 and the air flow channel 900. In a preferred embodiment, the air flow channel 900 is a cut out below position to the lip position panel 500 and above position to the lower lip receptacle 990.

Figure 16:
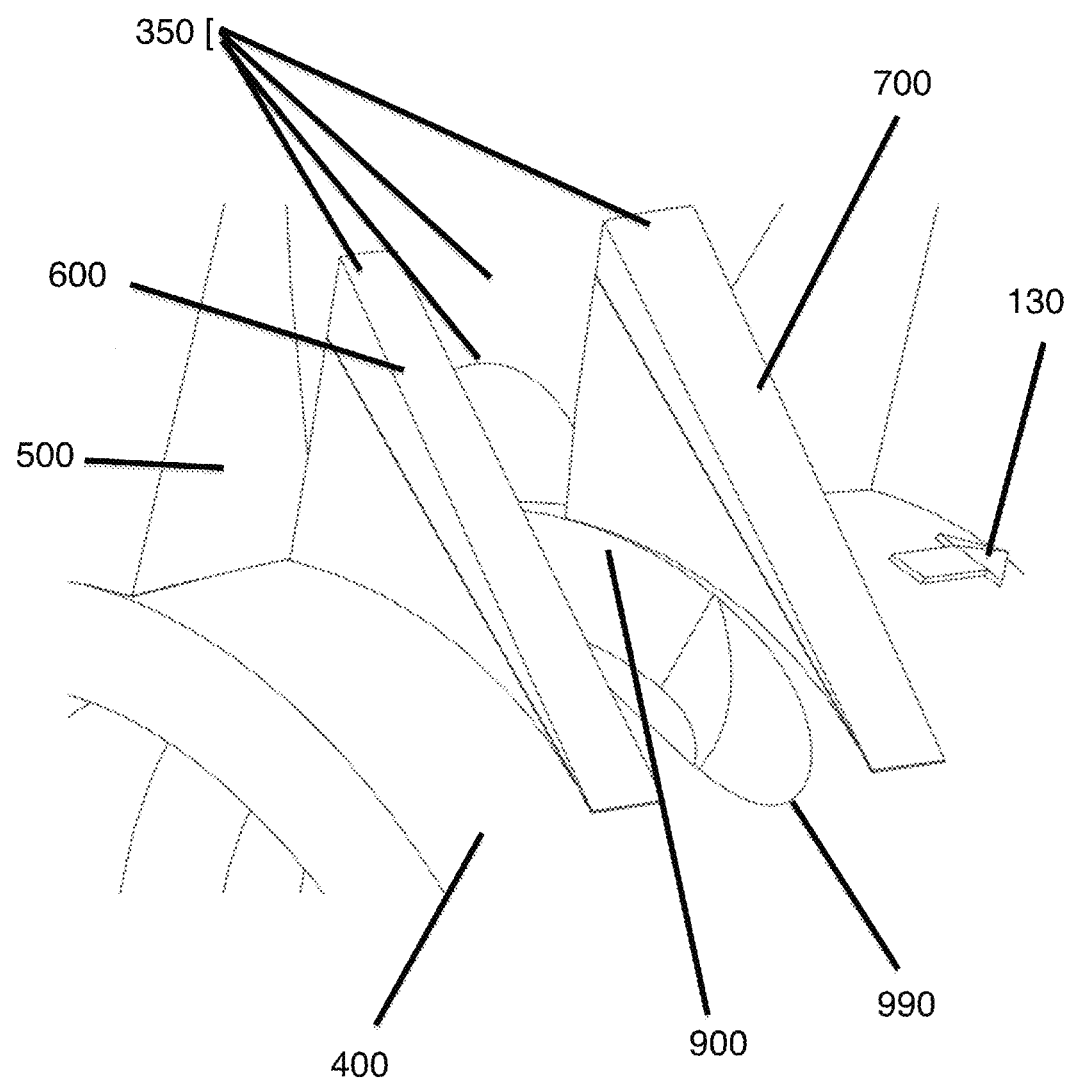
FIG. 16 is an exploded view of the air flow modulator.

FIG. 16 is a left side exploded view of the air flow modulator 350, showing the lip position panel 500 with its arch in the background and the left air channel guide 600 adjacent to the right air channel guide 700 both which are separated by the air flow channel 900, which is cut out above position to the lower lip receptacle 990. The lower lip receptacle 990 is preferably a depression in the lip plate cover 400. The marker 130 is a raised relief on the lip plate cover 400.

Figure 17:
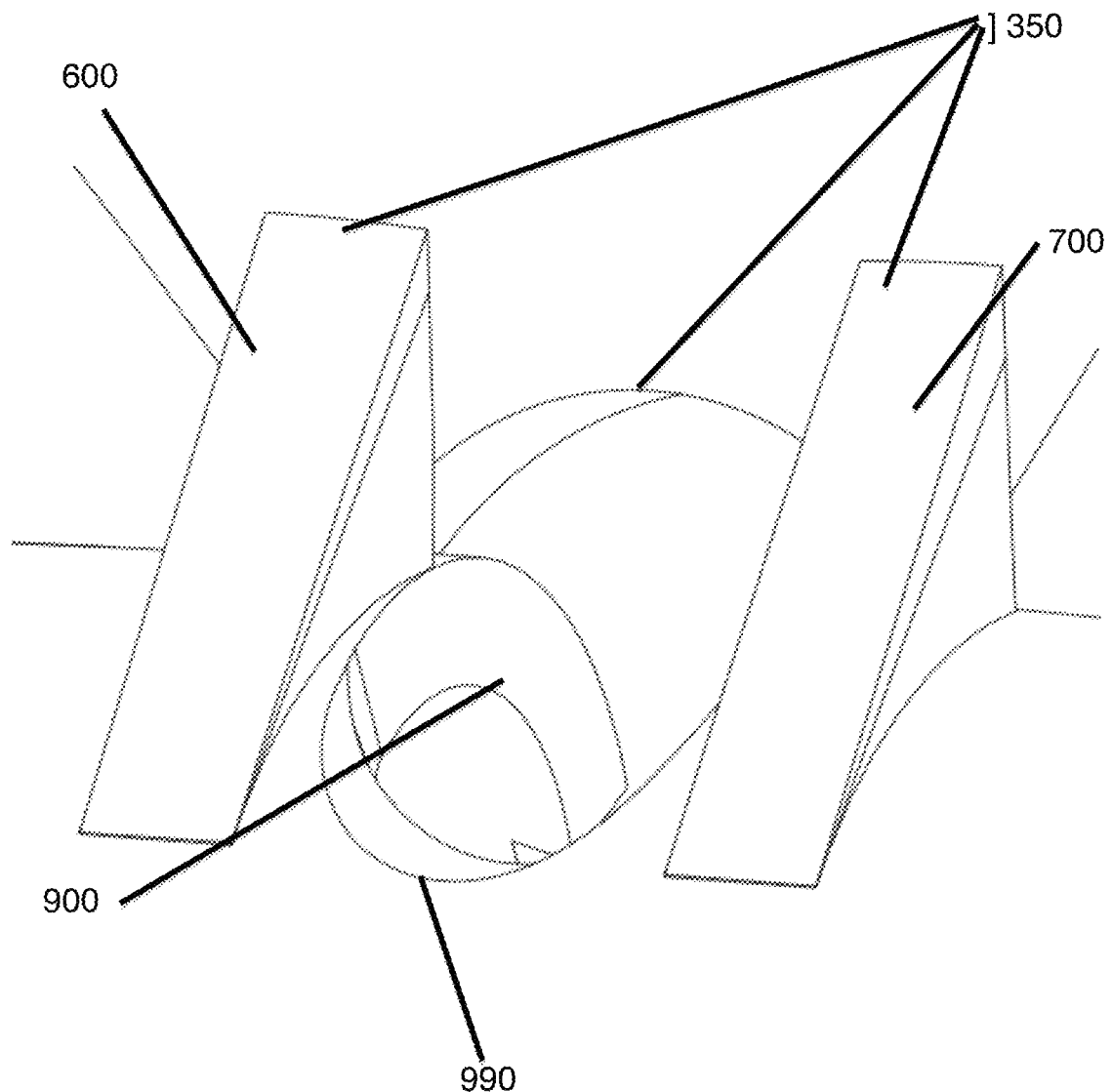
FIG. 17 is an exploded view of the air flow modulator.

FIG. 17 is a right side exploded view of the air flow modulator 350, showing the left air channel guide 600 lies adjacent to the right air channel guide 700 separated by the air flow channel 900, which is cut out above position to the lower lip receptacle 990.

Figure 18:
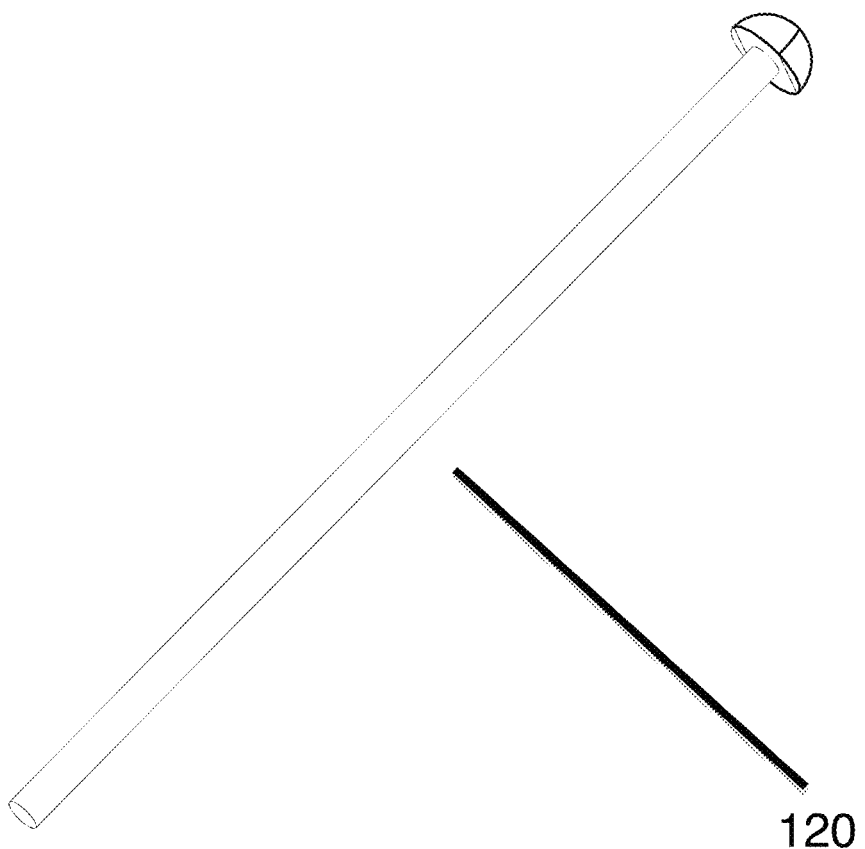
FIG. 18 is an exploded view of a connection pin (latch).

FIG. 18 is an exploded view of one embodiment of a latch 120.

Figure 19:
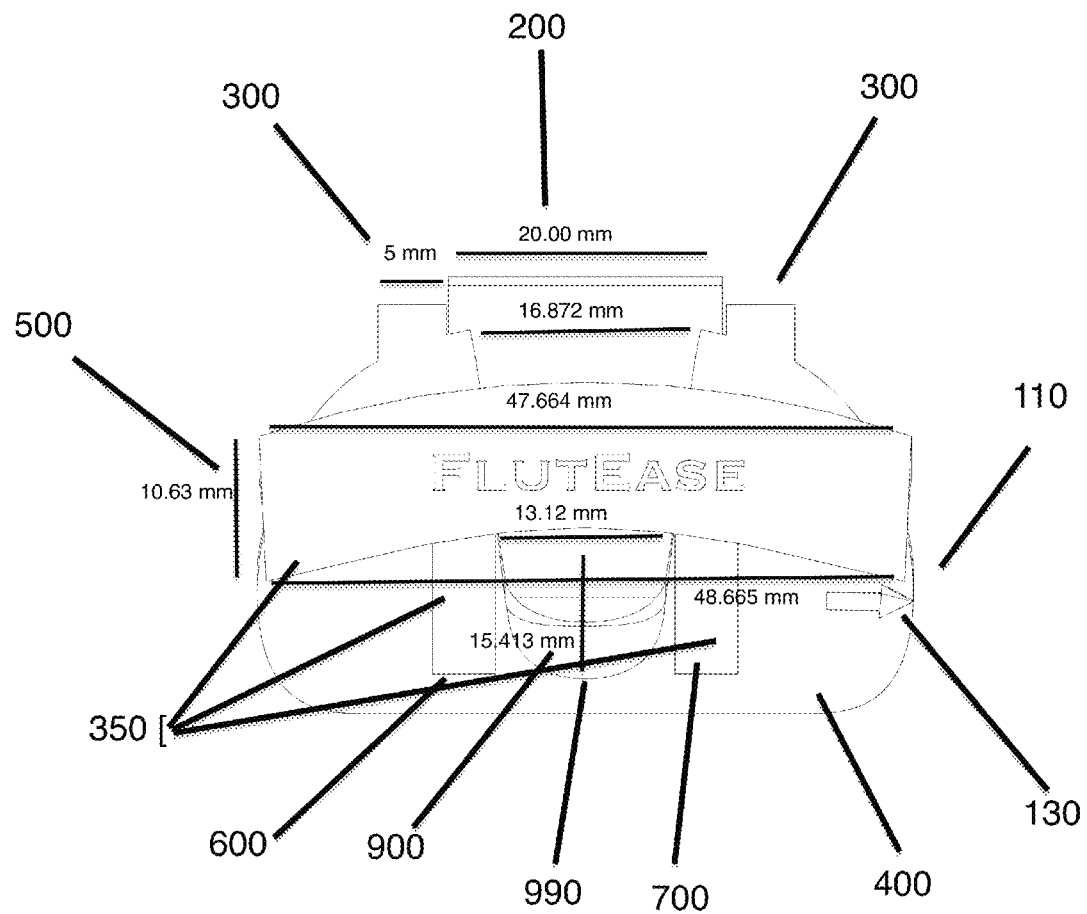
FIG. 19 is an exploded view of a latch canal receiving a connection pin (latch).

FIG. 19 a top view of one embodiment of the present invention showing the preferred dimensions of the major parts of the automatic embouchure 100 and position of said parts in relation to one another. In this particular embodiment, the lip position panel 500 is about 48.665 mm along the lower concave aspect, which coincides with the widest length of the lip body 110. The lip position panel is about 48.665 mm along the lower aspect, 10.63 mm in thickness and 47.664 mm along its top shorter aspect. The opening of the air flow channel 900 is about 13.12 mm across and measures 15.413 mm from the lower lip receptacle to the concave portion of the lip position panel 500. The primary connection means 200 is about 20 mm in width, and the one or more secondary connection means are each about 5 mm in width, but are separated by a gap of about 16.872 mm, thereby permitting the arms of the secondary connection means 300 to intimately connect to the primary connection means 200 by threading one or more connection pins 120 through the perpendicular pin connection holes 800 located at the distal positions of the primary connection means 200 and the secondary connection means 300.

The lip position panel 500 is concave and measure about 47.664 mm on one side and about 48.665 mm on the opposite side and is about 10.63 mm thick at its widest point. The left air channel guide 600 and the right air channel guide 700 are each about 4.417 mm by 18.372 mm by 18.683 mm, and are approximately 13.12 mm apart.

In another embodiment, the body 110 is about 98.02 mm long, about 3.402 mm high and about 47.8 mm wide FIG. 20 is a side view of an embodiment of the present invention showing the dimensions of the body 110, the lip position panel 500 and the right air channel guide rail 600. The right air channel guide rail 700 is triangular in shape, although it may be any shape, with each side measuring about 4.417 mm by 18.372 mm by 18.683 mm. The left air channel guide rail 600 has similar dimensions. The lip position panel 500 measures about 20.002 mm on the sides and about 10.63 mm along the top and about 4.583 mm along the bottom potion attaching to the body 110 at the lip plate cover 400. In one embodiment, the device can wrap around an instrument with about a diameter of about 23.117 mm. The one or more latch canals 800 are each about 1 mm in diameter, and are perpendicular openings on the distal portions of the one or primary connection means 200 and the one or more secondary connection means 300. The one or more primary connection means 200 and the one or more secondary connection means 300 each are about 3.402 mm in thickness.

Overall the device body 110 is about 3.402 mm thick, including the lip plate cover 400 the primary connection means 200 and the secondary connection means 300, and this is the approximate thickness of most portions of the device which wrap around and are intimately connected to the instrument when in use.

In another embodiment, the lip position panel 500 is about 46.665 mm along its top length and about 20.002 mm along its side. The left air channel guide rail 600 and the right air channel guide rail 700 are each about 18.372 mm at their highest portion and about 4.417 mm thick. The air flow channel 900 is a diameter of about 13.12 mm. The dimension of the secondary connection means 300 are each about 5 mm by about 3.402 mm. The width of the primary connection means 200 is about 20.002 mm.

In another embodiment, the latch canal 800 receives a latch 120 of about 30 mm in length. In a preferred embodiment of the invention, the latch 120 interconnects the primary connection means 200 with the secondary connection means 300 by passing a latch 120 through one or more latch canals 800.

Materials

The automatic embouchure 100 may be made from one or more of any material, including, but not limited to rubber, including but not limited to nylon, plastics, resins, rubber, one or more natural or synthetic rubbers, or synthetic natural rubbers, including, but not limited to one or more Polyacrylate Rubber, Ethylene-acrylate Rubber, Polyester Urethane, Bromo Isobutylene Isoprene, Polybutadiene, Chloro Isobutylene Isoprene, Polychloroprene, Chlorosulphonated Polyethylene, Epichlorohydrin, Ethylene Propylene, Ethylene Propylene Diene Monomer, Polyether Urethane, Perfluorocarbon Rubber, Fluoronated Hydrocarbon, Fluoro Silicone, Fluorocarbon Rubber, Fluoro Silicone, Fluorocarbon Rubber, Hydrogenated Nitrile Butadiene, Polyisoprene, Isobutylene Isoprene Butyl, Isobutylene Isoprene Butyl, Acrylonitrile Butadiene, Polyurethane, Styrene Butadiene, Styrene Ethylene Butylene Styrene Copolymer, Polysiloxane, Vinyl Methyl Silicone, Acrylonitrile Butadiene Carboxy Monomer, Styrene Butadiene Carboxy Monomer, Thermoplastic Polyether-ester, Styrene Butadiene Block Copolymer and Styrene Butadiene Carboxy Block Copolymer; foam, silicone, ABS, Polycarbonate, Noryl, PVC, polystyrene, ABS/PVC, PVC/Acrlic, Polysulfone, Acrylic, Polyethylene, Kydes, PETC, fiberglass, borosilicate, quartz, wood, metals, including but not limited to stainless steel, nickel, iron, tin, aluminum, copper, rubber including but not limited to natural rubber, SBR, Isoprene rubber, Butadiene rubber, chloroprene rubber; or any combination or composites of these material, natural materials, woven and non-woven fabrics, organic polymers, terpenes and terpenoids, elastomers, adhesives or other materials and new materials that may be manufactured in the future. The parts may be manufactured using identical or different material. The parts may also be manufactured using injection molding techniques known to those skilled in the art.

A preferred aspect of the invention is a method of playing the flute utilizing an automatic embouchure 100 of the present invention, said method comprising:
a) wrapping the device 100 around the flute head joint of a flute;
b) positioning the air flow channel 900 on top of the lip plate of a flute;
c) optionally marking the position of the device with a marking instrument; and
d) blowing into the air flow modulator 350.

In another preferred embodiment, the invention consists of a kit which contains the automatic embouchure 100 device and one or more instructions for use, a marker and optionally a carrying case.

In a most preferred embodiment, the lip position panel 500 is concave and the air flow modulator 350 has a slight downward slant towards an inner arch in the lip position panel 500 leading to the air flow channel 900.

Although the device can be of many sizes and dimensions, in a preferred embodiment, the device is approximately 4.8 cm in total width and about 10.37 cm in length. In one embodiment, the device is from about 4.56 cm to about 5.04 cm in total width. In another embodiment the device is from about 4.32 cm to about 5.28 cm in total width. In another embodiment the device is from about 2 cm to about 9 cm in total width.

In still another embodiment, the device is from about 9.85 cm to about 10.9 cm in total length. In another embodiment the device is from about 9.33 cm to about 11.41 cm in total length. In another embodiment the device is from about 6 cm to about 14 cm in total length.

Other embodiments include a device for assisting a subject in playing a flute, comprising: a body 110, an air flow modulator 350, one or more latches 120, a primary connection means 200, one or more secondary connection means 300, a lip plate cover 400, one or more latch canals 800 and optionally a lower lip receptacle 990.

In another preferred embodiment, the air flow modulator 350 further comprises: a lip position panel 500, a left air channel guide rail 600, a right air channel guide rail 700 and air flow channel 900.

In an alternate embodiment, the left air channel guide rail 650 and the right air channel guide rail 700 are one or more shapes selected from spherical, round, rectangular, square, triangular, semicircular and oblique. In other embodiments, the left air channel guide rail 600 and the right air channel guide rail 700 form about a 45 degree angle with the opening of air flow channel 900.

In yet another embodiment, the one or more latches 120 are removeably connected to one or more latch canals 800. In another embodiment, the one or more latch canals 800 are one or more shapes selected from hook-shape, U-shape, S-shape, Z-shape, C-shape, spherical, round, circular, eliptical, rectangular, square, triangular, semicircular and oblique. In a preferred embodiment, the one or more latch 800 canals are hook-shaped. In another preferred embodiment, the one or more latch canals 800 are continuous with said primary connection means 200.

In still another embodiment, the air flow channel 900 is continuous with said lip position panel 500 and said lip plate cover 400. In another embodiment, the lip position panel 500 is a shaped selected from spherical, round, rectangular, square, triangular, semicircular and oblique.

In other embodiments, the device is manufactured from one or more materials selected from nylon, plastics, resins, rubber, natural rubber, Ethylene Propylene Rubber, foam, silicone, ABS, Polycarbonate, Noryl, PVC, polystyrene, ABS/PVC, PVC/Acrlic, Polysulfone, Acrylic, Polyethylene, Kydes, PETC, fiberglas, borosilicate, quartz, wood, metals, nickel, iron, tin, aluminum, copper, rubber, natural rubber, SBR, Isoprene rubber, Butadiene rubber, and chloroprene rubber.

In a preferred embodiment, the device is manufactured of flexible material.

Another embodiment of the invention is a method of playing a flute utilizing the devices disclosed herein comprising: (1) wrapping said device around the flute head joint of a flute; (2) positioning said air flow channel of said device on top of the lip plate of the flute; (3) optionally marking the position of said device with a marking instrument; and (4) blowing into said air flow modulator 350.

In a preferred embodiment, the device comprises one or more of the following elements: (1) a body 110 about 10.37 cm long, about 0.3 cm high and about 4.08 cm wide; (2) a latch 120 about 2 cm in length; (4) a primary connection means 200 about 3 cm in length and which contains 4 widthwise slits for said latch 120 to fit and to secure said automatic embouchure around a flute head joint; (5) one or more secondary connection means 300 about 3.8 cm in length along their outer most aspects and about 3 cm in length along their inner aspects; (6) a lip plate cover 400 which is primarily circular with a diameter of about 4.8 cm and possess a cut out forming part of the air flow channel measuring about 0.3 cm in height; (7) a lip position panel 500 which is rectangular and concave in shape and about 4.08 cm in length; (8) a left air channel guide rail 600 and a right air channel guide rail 600, each measuring about 1 cm long and about 0.5 cm in length, and measures about 1.44 cm from the inner aspect of each air channel guide to the outer aspect of the lip position panel 500; (9) said left air channel guide rail 600 is the shape of a right triangle with each side measuring about 1 cm; and (10) a lip position plate which measures about 2 cm from the side of the body to which it is attached.

In yet another preferred embodiment, the air flow module comprises one or more of the following: (1) a left air channel guide rail 600 and right air channel guide rail 700, each measuring about 1 cm high and about 0.5 cm wide, and which are approximately 1.2 cm apart; (2) an air flow channel 900 which measures 0.3 cm in height; (3) a lip position panel 500 about 4.08 cm in length and about 2 cm in height; and (4) the primary connection means 200 of the body 110 of the automatic embouchure which measures about 4.8 cm in length and about 0.3 cm in height.

Another embodiment relates to a device for assisting a subject in playing a flute, comprising: a body 110, an air flow modulator 350, one or more primary connection means 200, one or more secondary connection means 300, a lip plate cover 400, and optionally a lower lip receptacle 990. In another embodiment, the air flow modulator 350 further comprises: a lip position panel 500, a left air channel guide rail 600, a right air channel guide rail 700 and air flow modulator 900. Still another embodiment relates to a left air channel guide rail 600 and a right air channel guide rail 700, wherein said left air channel guide rail 600 and said right air channel guide rail 700 are one or more shapes selected from spherical, round, rectangular, square, triangular, semicircular and oblique.

In another embodiment, the left air channel guide rail 600 and the right air channel guide rail 700 each forms about a 45 degree angle with the opening of the air flow channel 900.

In another embodiment, the primary connecting means 200 and the secondary connecting means 300 comprises one or more latch canals 800 and said secondary connecting means 300 comprises one or more latches 120.

In another embodiment, the primary connecting means 200 and the secondary connecting means 300 comprises one or more latches 120 and said secondary connecting means 300 comprises one or more latch canals 800.

In another embodiment the one or more latches 120 are removeably connected to one or more latch canals 800.

In another embodiment, the one or more latch canals 800 comprise one or more shapes selected from hook-shape, U-shape, S-shape, Z-shape, C-shape, spherical, round, circular, elliptical, rectangular, square, triangular, semicircular and oblique. In a preferred embodiment, the latch canals 800 are rounded holes which permeate the primary connection means 200 and the secondary connection means 300.

In a preferred embodiment, a latch 120 comprises one or more connection pins 120. For the purposes of one or more of the embodiments, the term latch 120 and connection pin(s) 120 are interchangeable. A connection pin 120 is any straight, preferably rigid instrument that optionally has a head to secure it in its place within one or more latch canals 800. In yet another preferred embodiment, said connection pins 120 are preferably manufactured from a rigid material. Preferred materials for manufacturing said connection pins 120 include, but are not limited to plastic, rubber, stainless steel, or any metal, wood, rubber or silicone. In a preferred embodiment, the connection pin 120 is manufactured from stainless steel.

In a preferred embodiment, the primary connection means 200 wraps around the instrument to be played, the secondary connection means 300 wrap around in the opposite direction to the primary connection means 200. The secondary connection means 300 then run parallel to the primary connection means 200 such that the latch canals 800 are in alignment such that they may receive the one or more connection pins 120. Optionally, the connection pin (also known as latch(es)) 120 has a flared end or a head such that it remains in place once it is received by the one or more latch canals 800.

In another embodiment, the primary connection means 200 and the secondary connection means 300 are continuous with one another. In still another embodiment, the one or more latch canals 800 are continuous with the primary connection means 200. In another embodiment, the air flow channel 900 is continuous with the lip position panel 500 and the lip plate cover 400. In still another embodiment, the lip position panel 500 comprises a shaped selected from spherical, round, rectangular, square, triangular, semicircular and oblique. In a preferred embodiment, the lip position panel 500 has an arch which opens into the air flow channel 900.

In another embodiment, the device is manufactured from one or more materials selected from nylon, plastics, resins, rubber, natural rubber, Santoprene, Ethylene Propylene Rubber, foam, silicone, ABS, Polycarbonate, Noryl, PVC, polystyrene, ABS/PVC, PVC/Acrlic, Polysulfone, Acrylic, Polyethylene, Kydes, PETC, fiberglass, borosilicate, quartz, wood, metals, nickel, iron, tin, aluminum, copper, rubber, natural rubber, SBR, Isoprene rubber, Butadiene rubber, and chloroprene rubber. In a preferred embodiment, the device is manufactured of flexible material.

Another aspect of the invention relates to a method of playing a flute utilizing the devices described herein comprising: wrapping said device around the flute head joint of a flute; positioning said air flow channel 900 of said device on top of the lip plate of the flute; optionally marking the position of said device with a marking instrument; and blowing into said air flow modulator 350.

Although the invention described herein may be any size or shape, another aspect of the invention is directed to body 110 about from 78.4 mm to about 117.6 mm long, about 2.7 mm to about 4.1 mm thick and about 38.3 mm to about 57.4 mm wide. In another embodiment, there is a latch 120 about from 24 mm to about 36 mm in length and a thickness about from about 0.8 mm to about 1.2 mm. In yet another embodiment there are one or more primary connection means 200 about from 27.3 mm to about 33.9 mm in length. In another embodiment there are one or more secondary connection 300 means about from 22.6 mm to about 33.9 mm in length along their outer aspects and about from 20.11 mm to about 30.2 in length along their inner aspects. In still another embodiment there is a lip plate cover 400 which is primarily circular with a diameter of about from 38.2 mm to about 57.4 mm Another aspect of the invention is directed to an air flow channel 900 about from 10.5 mm to about 15.8 mm in diameter. In still another embodiment the lip position panel 500 is about from 3.4 to about 55.9 mm in length, from about 16 mm to about 24 mm, by about from 3.7 mm to about 5.5 mm, by about from 8.5 to about 12.8 mm.

In another embodiment, there is a left air channel guide rail 600 and a right air channel guide rail 700 each measuring about 7.3 mm to about 10.9 mm on one side and about from 3.5 mm to about 5.3 mm on another side, and about from 14.9 mm to about 22.4 mm from the inner aspect of each air channel guide to the outer aspect of the lip position panel 500.

In another embodiment the lip plate cover 400 measures about from 16 mm to about 24 mm from the side of the body 110 to which it is attached to the distal aspect of the lip position panel 500. In still another embodiment, the air flow modulator 350 comprises a left air channel guide rail 600 and right air channel guide rail 700, each measures about from 3.5 mm to about 5.3 mm by about from 14.7 mm to about 22.1 mm by about from 15 mm to about 22.4 mm, and are approximately about from 10.5 mm to about 15.8 mm apart. In yet another embodiment, the air flow channel 900 measures about from 10.5 mm to about 15.8 mm in diameter.

In still another embodiment, the lower lip receptacle 990 measures from about 12.3 mm to about 18.5 mm in length from its origin at the lip position panel 500 to the distal aspect of said lower lip receptacle 990. In another aspect of the invention, the lip position panel 500 measures about from 12.3 mm to about 12.8 mm in thickness at its widest point and about from 3.7 mm to about 5.5 mm at its thinnest point, from about 38.1 mm to about 57.2 mm in length on one side, from about 39 mm to about 58.4 mm in length on its opposite side and is about from 16 mm to about 24 mm high.

With regard to FIG. 20, although the invention described herein may be any size or shape, in one embodiment the device of the present invention comprises: a body 110 about 10.37 cm long, about 0.3 cm high and about 4.08 cm wide; a latch 120 about 2 cm in length; a primary connection means 200 about 3 cm in length and which contains 4 width-wise slits for said latch 120 to fit and to secure said automatic embouchure around a flute head joint; one or more secondary connection means 300 about 3.8 cm in length along their outer most aspects and about 3 cm in length along their inner aspects; a lip plate cover 400 which is primarily circular with a diameter of about 4.8 cm and possess a cut out forming part of the air flow channel 900 measuring about 0.3 cm in height; a lip position panel 500 which is rectangular in shape and about 4.08 cm in length; a left air channel guide rail 600 and a right air channel guide rail 700, each measuring about 1 cm long and about 0.5 cm in length, and measures about 1.44 cm from the inner aspect of each, left and right air channel guide rail 600,700 to the outer aspect of the lip position panel 500; said left air channel guide rail 600 and said left air channel guide rail 700 are each the shape of a right triangle with each side measuring about 1 cm; and a lip position panel 500 which measures about 2 cm from the side of the body to which it is attached.

In still another embodiment, the air flow module comprises: a left air channel guide rail 600 and right air channel guide rail 700, each measuring about 1 cm high and about 0.5 cm wide, and which are approximately 1.2 cm apart; an air flow channel 900 which measures 0.3 cm in height; a lip position panel 500 about 4.08 cm in length and about 2 cm in height; and a primary connection means 200 of the body 110 of the automatic embouchure which measures about 4.8 cm in length and about 0.3 cm in height.

In a preferred embodiment the device of the present invention comprises: a body 110 about 98.02 mm in length, about 3.402 mm thick and about 47.8 mm wide; a latch about 30 mm in length length and a thickness sufficient to pass through said one or more latch canals. In one embodiment, the one or more latch canals are an opening of sufficient size and shape to accommodate one or more latches. In one embodiment, the one or more latches 120 sufficient size and shape to accommodate one or more latch canals 800. In a preferred embodiment the latch is approximately 30 mm in length and less than 1 mm wide.

The primary connection means 200 may be about 34.08 mm in length and contains about 4 circular openings about 1 mm in diameter for said latch 120 to fit and to secure said automatic embouchure 100 around a flute head joint; one or more secondary connection means 300 about 34.08 mm in length along their outer most aspects and about 3.402 mm in thickness; a lip plate cover 400 which has an air flow channel 900 which is primarily a circular opening with a diameter of about 13.12 mm and 3.402 mm in thickness; a lower lip receptacle 990 which is oval in shape and measures about 15.413 mm from its origin to across the position of the lip position panel 500; a left air channel guide rail 600 and a right air channel guide rail 700, each measuring about 4.417 mm by 18.372 mm by 18.683 mm; said left air channel guide rail 600 and said right air channel guide rail 700 is the shape of a right triangle; and a lip position panel 500 which measures about 20 mm from the side of the body 110 to which it is attached.

In still another embodiment, the air flow modulator 350 comprises: a left air channel guide rail 600 and right air channel guide rail 700, each about 4.417 mm by 18.372 mm by 18.683 mm, and which are approximately 13.12 mm apart; an air flow channel 900 which measures 13.12 mm in diameter; a lower lip receptacle 990 about 15.413 mm in length from its origin to the lip position panel 500; and a lip position panel 500 which is concave and measures about 10.63 mm in thickness at its widest point and 4.583 mm at its thinnest point, 47.664 mm on one side and is about 20.002 mm high.

In a preferred embodiment of the invention, the device comprises: a body 110 about 98.02 mm long, about 3.402 mm high and about 47.8 mm wide; a latch 120 about 30 mm in length; a primary connection means about 34.08 mm in length and which contains one or more circular openings to receive said latch 120; one or more secondary connection means about 28.21 mm in length along their outer most aspects and about 25.14 mm in length along their inner aspects; a lip plate cover 400 which is primarily circular with a diameter of about 47.8 mm and possess a cut out measuring about 13.12 mm in diameter; a lip position panel 500 which is primarily rectangular in shape and about 46.665 mm in length 20.002 mm by 4.583 mm by 10.63 mm; a left air channel guide rail 600 and a right air channel guide rail 700, each measuring about 9.12 mm long and about 4.417 mm in length, and measures about 18.683 mm from the inner aspect of each air channel guide rail 600,700 to the outer aspect of the lip position panel 500; a left air channel guide rail 600 and a right air channel guide rail 700 each triangular in shape; a lip position panel 500 which measures about 20.002 mm from the side of the body to which it is attached to the distal aspect of the lip position panel 500.

In yet a still more preferred embodiment, the air flow modulator 350 of the invention comprises: a left air channel guide rail 600 and a right air channel guide rail 700, each about 4.417 mm by 18.372 mm by 18.683 mm, and which are approximately 13.12 mm apart; an air flow channel 900 which measures 13.12 mm in diameter. In another embodiment, the air flow channel 500 about 15.413 mm in length from its origin at the lip position panel 500 to the distal aspect of the lower lip receptacle 990. In another embodiment, the lip position panel which is concave and measures about 10.63 mm in thickness at its widest point and 4.583 mm at its thinnest point, 47.664 mm on one side and, 48.665 mm in length on its opposite side and is about 20.002 mm high.

The invention is further directed to a device for assisting a subject in playing a flute, comprising: a body 110, a lip plate cover 400, an air flow modulator 350, one or more primary connection means 200 and one or more secondary connection means 200, one or more latch canals 800, and one or more latches 120 removeably connected to said one or more latch canals 800.

Another aspect of the invention is directed to an air flow modulator 350, further comprising:
- a. a left air channel guide rail 600 and a right air channel guide rail 700, substantially parallel to one another and each intimately connected to said lip plate cover 400;
- b. an air flow channel 900 carved from said lip plate cover 400 and continuous with a lower lip receptacle 990; and
- c. a lip position panel 500 perpendicular to and intimately connected to said lip plate cover 400; and optionally
- d. a lower lip receptacle 990.

In another embodiment, the left air channel guide rail 600 and the right air channel guide rail 700 are each one or more shapes selected from spherical, round, rectangular, square, triangular, semicircular and oblique. In another embodiment, the left air channel guide rail 600 and the right air channel guide rail 700 are at about a 45 degree angle to the lip plate cover 400.

In another embodiment, the one or more primary connection means 200 and said one or more secondary connection means 300 is continuous with the lip plate cover 400. In another embodiment, the one or more latch canals 800 is continuous with the one or more primary connection means 200 and with the one or more secondary connection means 300. In still another embodiment, the one or more latch canals 800 are one or more shapes selected from cylindrical, hook-shape, U-shape, S-shape, Z-shape, C-shape, spherical, round, circular, elliptical, rectangular, square, triangular, semicircular and oblique. In a further embodiment, the one or more latches 120 are one or more shapes selected from cylindrical, cylindrical with one or more heads, hook-shape, U-shape, S-shape, Z-shape, C-shape, spherical, round, circular, elliptical, rectangular, square, triangular, semicircular and oblique.

In another aspect of the invention, the primary connection means 200 is continuous with the secondary connection means 300. In other aspects of the invention, the primary connection means 200 is removeably connected to the secondary connection means 300.

According to other aspects of the invention, the lip position panel 500 comprises a shaped selected from one or more, concave, convex, spherical, round, rectangular, square, triangular, semicircular and oblique. In still another embodiment, the lip position panel 500 is wider at the portion distal to the lip plate cover 400 than at the portion proximate to the lip plate cover 400.

Another aspect of the invention further relates to a device comprising:
- a. a body 110 about from 78.4 mm to about 117.6 mm long, about 2.7 mm to about 4.1 mm thick and about 38.3 mm to about 57.4 mm wide;
- b. a lip plate cover 400 which is primarily circular with a diameter of about from 38.2 mm to about 57.4 mm;
- c. an air flow modulator 350 comprising:
  - i. a left air channel guide rail 600 and said right air channel guide rail 700, each measuring about 7.3 mm to about 10.9 mm on one side and about from 3.5 mm to about 5.3 mm on another side, and about from 14.9 mm to about 22.4 mm from the inner aspect of each air channel guide rail to the outer aspect of the lip position panel, and which are approximately about from 10.5 mm to about 15.8 mm apart;
  - ii. an air flow channel 900 which measures about from 10.5 mm to about 15.8 mm in diameter;
  - iii. a lip position panel 500 which measures about from 12.3 mm to about 12.8 mm in thickness at its widest point and about from 3.7 mm to about 5.5 mm at its thinnest point, from about 38.1 mm to about 57.2 mm in length on one side, from about 39 mm to about 58.4 mm in length on its opposite side and is about from 16 mm to about 24 mm high.
  - iv. a lower lip receptacle 990 about from about 12.3 mm to about 18.5 mm in length from its origin at the lip position panel 500 to the distal aspect of the lower lip receptacle 990.

In another embodiment of the invention, the one or more primary connection means 200 is about from 27.3 mm to about 33.9 mm in length. In another embodiment, the one or more secondary connection means 300 is about from 22.6 mm to about 33.9 mm in length along their outer aspects and about from 20.11 mm to about 30.2 in length along their inner aspects. In another embodiment, the one or more latch canals 800 is about from 24 mm to about 36 mm in length and about 0.8 mm to about 1.2 mm wide. In another embodiment, the one or more latches 120 is about from 24 mm to about 36 mm in length and a thickness about from about 0.8 mm to about 1.2 mm.

In a preferred embodiment the device comprises:
- a. a body 110 about 98.02 mm long, about 3.402 mm thick and about 47.8 mm wide;
- b. a lip plate cover 400 which is primarily circular with a diameter of about 47.8 mm from the side of the body 110 to which it is attached to the distal aspect of said lip position panel 500;
- c. an air flow modulator 350 comprising:
  - i. a left air channel guide rail 600 and a right air channel guide rail 700, each measuring about 9.12 mm on one side and about 4.417 mm on another side, and about 18.683 mm from the inner aspect of each air channel guide rail (600,700) to the outer aspect of the lip position panel 500, and which are approximately 13.12 mm apart;
  - ii. an air flow channel 900 which is about 13.12 mm in diameter;
  - iii. a lip position panel 500 which measures about 10.63 mm in thickness at its widest point and 4.583 mm at its thinnest point, 47.664 mm in length on one side and 48.665 mm in length on its opposite side and is about 20.002 mm high; and
  - iv. a lower lip receptacle 990 is about 15.413 mm in length from its origin at the lip position panel to the distal aspect of said lower lip receptacle;

In a preferred embodiment, the one or more primary connection means 200 is about 34.08 mm in length. In another embodiment, the one or more secondary connection means 300 about 28.21 mm in length along their outer aspects and about 25.14 mm in length along their inner aspects. In another aspect of the invention, the one or more latch canals 800 have an opening about 1 mm wide; and in another aspect of the invention, the one or more latches 120 is about 30 mm in length and have a thickness of about 1 mm.

In another preferred aspect of the invention, the one or more latch canals 800 is an opening of sufficient size and shape to accommodate the one or more latches 120.

Another aspect of the invention relates to a device which assists a subject in increasing the blowing force of his/her embouchure. Another embodiment relates to a device where a lip position panel extends from below the player's nose to below the player's upper lip.

In another embodiment the device forms an air seal around the lip plate of a flute to which it is attached.

In yet another embodiment, there is a kit for assisting a subject in playing the flute comprising one or more of the devices described herein, one or more carrying cases, one or more marking instruments and instructions for utilizing the device. The kit may also comprise instructions which are in one or more formats selected from print and electronic.

In another embodiment, the device of assists a subject in increasing the blowing force of his/her embouchure.

In yet another embodiment, the device comprises a lip position panel 500 which extends from below the player's nose to below the player's upper lip.

In a preferred embodiment, the device forms an air seal around the lip plate of a flute to which it is attached.

Other aspects of the invention include a kit for assisting a subject in playing the flute comprising one or more of the devices substantially described herein, and one or more carrying cases, one or more marking instruments and instructions for utilizing the device. In another embodiment, the kit further comprises instructions which are in one or more formats selected from print and electronic.

One skilled in the art will appreciate that the present invention can be carried out in other ways and practiced by other than the described embodiments, yet not departing from the spirit and essential characteristics depicted herein. The present embodiments therefore should be considered in all respects as illustrative.

What is claimed:

1. A device for assisting a subject in playing a flute, comprising:
   a. a body;
   b. a lip plate cover;
   c. an air flow modulator comprising
      i. a left air channel guide rail and a right air channel guide rail, substantially parallel to one another and each intimately connected to said lip plate cover;
      ii. an air flow channel carved from said lip plate cover and continuous with a lower lip receptacle; and
      iii. a lip position panel perpendicular to and intimately connected to said lip plate cover; and
      iv. a lower lip receptacle;
   c. one or more primary connection means and one or more secondary connection means;
   d. one or more latch canals; and
   e. one or more latches removeably connected to said one or more latch canals.

2. The device according claim 1, wherein said left air channel guide rail and said right air channel guide rail are each one or more shapes selected from spherical, round, rectangular, square, triangular, semicircular and oblique.

3. The device according claim 1, wherein said left air channel guide rail and said right air channel guide rail are at about a 45 degree angle to said lip plate cover.

4. The device according to claim 1, wherein said lip position panel comprises a shaped selected from one or more, concave, convex, spherical, round, rectangular, square, triangular, semicircular and oblique.

5. The device according to claim 1, wherein said lip position panel is wider at the portion distal to said lip plate cover than at the portion proximate to said lip plate cover.

6. The device according to claim 1, comprising:
   a. said body about from 78.4 mm to about 117.6 mm long, about 2.7 mm to about 4.1 mm thick and about 38.3 mm to about 57.4 mm wide;
   b. said lip plate cover which is primarily circular with a diameter of about from 38.2 mm to about 57.4 mm;
   c. said air flow modulator comprising:
      i. said left air channel guide rail and said right air channel guide rail, each measuring about 7.3 mm to about 10.9 mm on one side and about from 3.5 mm to about 5.3 mm on another side, and about from 14.9 mm to about 22.4 mm from the inner aspect of each air channel guide rail to the outer aspect of the lip position panel, and which are approximately about from 10.5 mm to about 15.8 mm apart;
      ii. said air flow channel which measures about from 10.5 mm to about 15.8 mm in diameter;
      iii. said lip position panel which measures about from 12.3 mm to about 12.8 mm in thickness at its widest point and about from 3.7 mm to about 5.5 mm at its thinnest point, from about 38.1 mm to about 57.2 mm in length on one side, from about 39 mm to about 58.4 mm in length on its opposite side and is about from 16 mm to about 24 mm high;
      iv. said lower lip receptacle about from about 12.3 mm to about 18.5 mm in length from its origin at the lip position panel to the distal aspect of said lower lip receptacle;
   d. said one or more primary connection means about from 27.3 mm to about 33.9 mm in length
   e. said one or more secondary connection means about from 22.6 mm to about 33.9 mm in length along their outer aspects and about from 20.11 mm to about 30.2 in length along their inner aspects;
   f. said one or more latch canals about from 24 mm to about 36 mm in length and about 0.8 mm to about 1.2 mm wide;
   g. said one or more latches about from 24 mm to about 36 mm in length and a thickness about from about 0.8 mm to about 1.2 mm.

7. The device according to claim 1, comprising:
   a. said body about 98.02 mm long, about 3.402 mm thick and about 47.8 mm wide;
   b. said lip plate cover which is primarily circular with a diameter of about 47.8 mm from the side of the body to which it is attached to the distal aspect of said lip position panel;
   c. said air flow modulator comprising
      i. said left air channel guide rail and a right air channel guide rail, each measuring about 9.12 mm on one side and about 4.417 mm on another side, and about 18.683 mm from the inner aspect of each air channel guide rail to the outer aspect of said lip position panel, and which are approximately 13.12 mm apart;
      ii. said air flow channel which about 13.12 mm in diameter;
      iii. said lip position panel which measures about 10.63 mm in thickness at its widest point and 4.583 mm at its thinnest point, 47.664 mm in length on one side and 48.665 mm in length on its opposite side and is about 20.002 mm high;
      iv. said lower lip receptacle about 15.413 mm in length from its origin at the lip position panel to the distal aspect of said lower lip receptacle;
   d. said one or more primary connection means about 34.08 mm in length;

e. said one or more secondary connection means about 28.21 mm in length along their outer aspects and about 25.14 mm in length along their inner aspects;
f. said one or more latch canals having an opening about 1 mm wide; and
g. said one or more latches about 30 mm in length and a thickness of about 1 mm.

\* \* \* \* \*